United States Patent
Wang

(10) Patent No.: US 8,565,063 B2
(45) Date of Patent: Oct. 22, 2013

(54) METHOD AND SYSTEM FOR ADAPTIVE ORTHOGONAL FREQUENCY DIVISION MULTIPLEXING USING PRECODED CYCLIC PREFIX

(76) Inventor: Xianbin Wang, London (CA)

( * ) Notice: Subject to any disclaimer, the term of this patent is extended or adjusted under 35 U.S.C. 154(b) by 0 days.

(21) Appl. No.: 12/437,358

(22) Filed: May 7, 2009

(65) Prior Publication Data
US 2009/0279626 A1   Nov. 12, 2009

Related U.S. Application Data

(60) Provisional application No. 61/051,220, filed on May 7, 2008.

(51) Int. Cl.
*H04J 11/00*   (2006.01)

(52) U.S. Cl.
USPC .......................................................... 370/208

(58) Field of Classification Search
USPC .......................................... 370/208, 254, 332
See application file for complete search history.

(56) References Cited

U.S. PATENT DOCUMENTS

| | | | | |
|---|---|---|---|---|
| 2006/0050799 | A1* | 3/2006 | Hou et al. ....................... | 375/260 |
| 2007/0160118 | A1* | 7/2007 | Charbit ........................... | 375/145 |
| 2007/0189240 | A1* | 8/2007 | Cho et al. ....................... | 370/337 |
| 2008/0014880 | A1 | 1/2008 | Hyon et al. | |
| 2008/0025424 | A1* | 1/2008 | Yang et al. .................... | 375/260 |
| 2008/0080604 | A1 | 4/2008 | Hur et al. | |
| 2008/0089389 | A1 | 4/2008 | Hu | |
| 2008/0090528 | A1* | 4/2008 | Malladi .......................... | 455/70 |
| 2009/0034438 | A1* | 2/2009 | Soulie et al. .................. | 370/280 |
| 2010/0321577 | A1* | 12/2010 | Park et al. ..................... | 348/575 |

OTHER PUBLICATIONS

Xianbin Wang, Yiyan Wu, Hsiao-Chun Wu; A new adaptive OFDM System with Precoded Cyclic Prefix for Cognitive Radio; IEEE 2008; 978-1-4244-2075-9/08; pp. 3642-3646.

Xianbin Wang, Han-Wei Chen et al; Identification of PCP-OFDM Signals at very low SNR for Spectrum Efficient Communications; IEEE 2009; 978-1-4244-2517-4/09; pp. 1-5.

* cited by examiner

*Primary Examiner* — Huy D Vu
*Assistant Examiner* — Adnan Baig
(74) *Attorney, Agent, or Firm* — Miller Thomson LLP

(57) ABSTRACT

A method for adaptive signal communication on a wireless or wireline network is disclosed including detecting the communication environment or determining the communication requirements, for communication on the wireless or wireline network. The method may include determining system parameter information for adaptive Orthogonal Frequency Division Multiplexing (OFDM) based on the communication environment or communication requirements and encoding the system parameter information into at least one precoded cyclic prefix (PCP) sequence. The method further provides for generating an OFDM symbol transmission by combining at least one PCP, and an adaptive OFDM symbol, using the system parameters, then transmitting the signal from at least one OFDM transmitter to at least one OFDM receiver followed by demodulating the at least one PCP, and demodulate the OFDM signal using the system parameters recovered. A related OFDM system for implementing the method for a wireless or wireline network or platform is disclosed as are wireless or wireline devices operable with this method.

17 Claims, 11 Drawing Sheets

(a) Transmitter (b) Receiver

METHOD AND SYSTEM FOR ADAPTIVE ORTHOGONAL FREQUENCY DIVISION MULTIPLEXING USING PRECODED CYCLIC PREFIX

FOREIGN PRIORITY INFORMATION

This application claims priority to U.S. Provisional Patent Application No. 61/051,220, filed May 7, 2008.

FIELD OF INVENTION

This invention relates in general to the field of wireless or wireline information infrastructure and more particularly to systems and methods for adaptive wireless or wireline networks and network devices.

BACKGROUND

Convergence of different wireless communication systems and networks is becoming more prevalent, as well as seamless connections between wireless and backbone wired networks. Adaptive technologies in mobile transceiver design, network and application services can provide an important role in supporting such diverse mobile multimedia services. These trends in wireless communications bring several fundamental challenges for wireless system and network designs.

The nature of mobile multimedia communication is dynamic, due partly to the fast variation of wireless channels, and partly to the wide range of user applications and requirements. The user mobility and the short wavelength of a broadband wireless signal mean that the system throughput can vary substantially within a few microseconds or a few feet in distance. Similarly, the traffic of wireless communications also changes from the constant low rate voice communications, to high sporadic internet browsing and broadband video communications.

The traditional design methodology for mobile multimedia communication is to devise the wireless system for the maximum data request under the "worst case" wireless channel condition. Such a design could result in a scenario that all the system resources are committed to one user and no one else could be accommodated. In contrast to the "worst-case" design methodology, considerable bandwidth, battery power, latency, and other communication resources can be conserved by adapting the transmission parameters to current channel conditions and application requirements.

There is a need to develop flexible transmission technologies which can adapt to current mobile multimedia communication conditions and requirements in the most efficient and reliable way.

The fast evolution of wireless communications also brings challenge of efficient spectrum utilization. Today's wireless communication systems are characterized by a fixed spectrum allocation policy, i.e. the spectrum is regulated by governmental agencies and is assigned to license holders on a long term basis for large geographical regions. With the existing radio spectrum regulatory framework, access to radio spectrum is frustratingly difficult. According to Federal Communications Commission (FCC), temporal and geographical utilization rate of the assigned spectrum can be as low as 15% [1, 2] at any location and at any given time. Although the fixed spectrum assignment policy generally served well in the past, the dramatic increase in wireless communications in recent years poses a looming challenge due to spectrum overcrowding. Improving the spectrum utilization efficiency is required to support the wireless communications that will continue to fuel the economic growth. The limited availability of spectrum and the inefficiency of its usage necessitate a new communication paradigm termed cognitive radio to exploit the existing wireless spectrum opportunistically.

US Patent Application, Publication Number US 2008/0014880 A1, invented by Hyon et al., discloses a signaling method between a cognitive radio (CR) base station and a CR terminal in a CR environment, in which a channel division method is used for the signaling method, the method including: detecting a channel usage of an incumbent system, which communicates with a CR base station; sensing an outband channel to communicate with the CR base station; receiving an EOS, which is broadcasted from the CR base station via the outband channel according to a pre-determined period; and transmitting a sensing report signal with respect to the channel to the CR base station. This technique is designed for point to multipoint communications were a base station and mobile CR users have pre-arranged signal form a to exchange information. This is achieved through signaling transmission using outband channel which would require extra bandwidth.

US Patent Application, Publication Number US 2008/0080604 A1, inventor Hur et al., discloses spectrum-sensing algorithms and methods for use in cognitive radios and other applications. The spectrum-sensing algorithms and methods may include receiving an input spectrum having a plurality of channels, performing a coarse scan of the plurality of channels of the input spectrum to determine one or more occupied candidate channels and vacant candidate channels, where the coarse scan is associated with a first resolution bandwidth and a first frequency sweep increment, performing a fine scan of the occupied candidate channels and the vacant candidate channels to determine actually occupied channels and actually vacant channels, where the fine scan is associated with a second resolution bandwidth and a second frequency sweep increment, and storing an indication of the actually occupied channels and the actually vacant channels. The signal detection method disclosed is power/energy detection. The sensing decision is based on the existence of signal power and may not be able to distinguish signal from interference.

US Patent Application publication number US 2008/0089389 A1, inventor Hu, relates to cognitive radio based wireless communications of dynamic spectrum access networks, and in particular to a method of addressing zero-delay frequency switching for cognitive dynamic frequency hopping. The method combines regular (periodic) channel maintenance with dynamic frequency hopping over a cluster of vacated channels that are initially setup such that the switching delays for channel setup and channel availability check are eliminated. The method disclosed does not manipulate the physical layer.

Cognitive radio is a revolutionary technology that provides improvements in efficiency of spectrum usage. Ever since Joseph Mitola III [3, 4] established the phrase "cognitive radio" in his thesis, many definitions of what a true cognitive radio can look like have been discussed in literature. The cognitive radio is normally defined as an intelligent wireless communication system that is aware of its environment and uses the methodology of "understanding-by-building" to learn from the environment and adapt to statistical variations in the input stimuli, with the efficient utilization of the radio spectrum as the primary objective [5]. The Federal Communications Commission (FCC) defines cognitive radios as radio systems that continuously perform spectrum sensing, dynamically identify unused spectrum, and then operate in this spectrum at times when it is not used by incumbent radio systems [1]. Modern wireless LAN IEEE 802.11 devices operate with a listen-before-talk spectrum access and with dynamically changing frequencies and transmission power [6, 7]. However, such existing standards provide only a subset of the required techniques for cognitive radio, and do not cover the full range of objectives for efficiently using the spectrum. On the other hand, the terrestrial TV broadcast band is currently in the process of being reorganized for the roll-out of digital video broadcast [8, 9]. This change is pursued in parallel in many regulatory domains worldwide. With the introduction of the single frequency transmission network and advanced equalization technique, the total number of the Digital TV channels would be significantly reduced to maintain the current terrestrial TV coverage [10]. It is therefore envisioned to allow such unlicensed reuse of the some of the TV broadcast band for cognitive radios that scan all TV channels throughout the band and operate only upon identification of spectrum opportunities.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
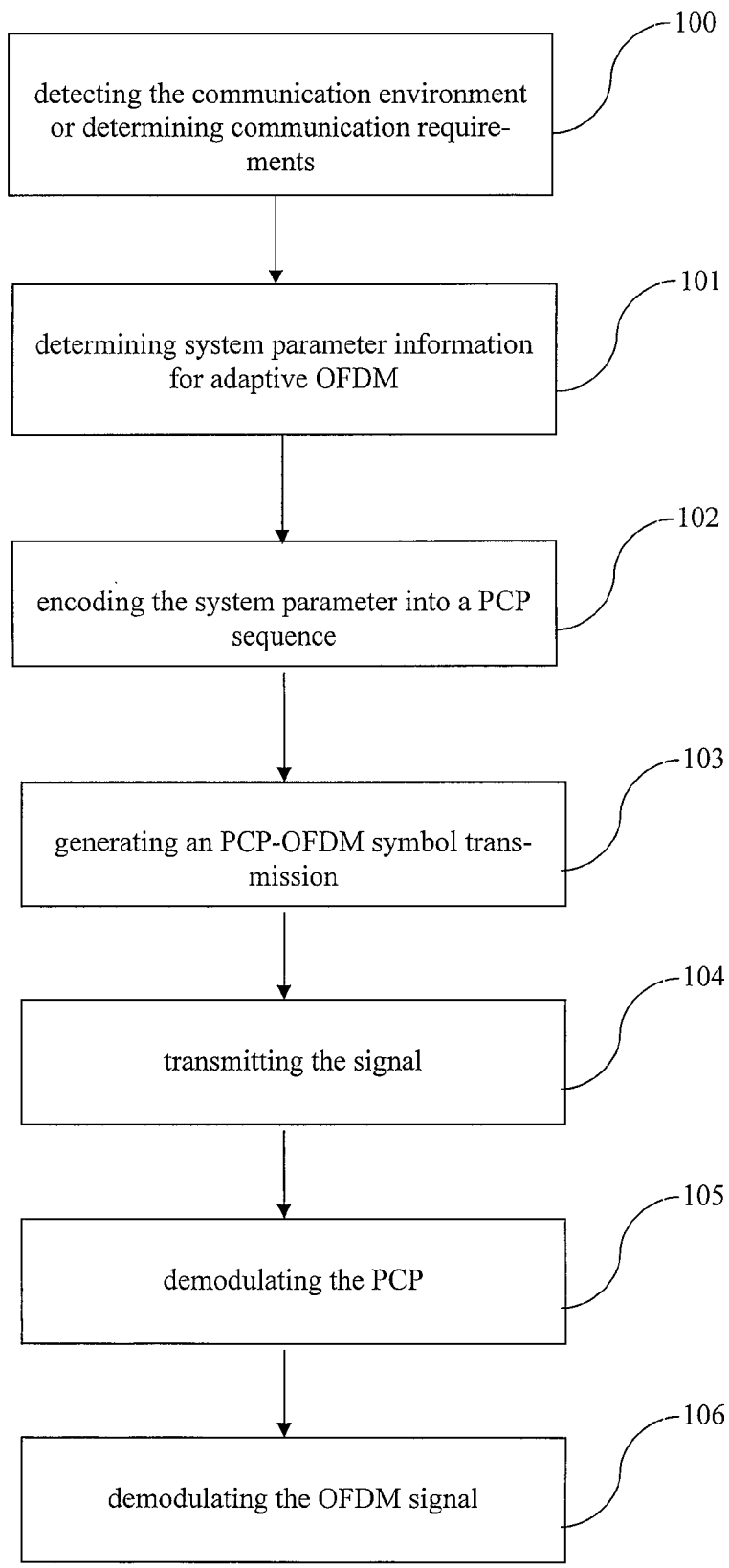
FIG. 1 illustrates in flow chart form the method of one embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Overview

Recent development in cognitive radio (CR) and variable-rate multimedia communications bring significant technical challenges in the design of robust adaptive transmission technique in hostile communication environment due to the strong interference and the diverse data rate requirement and channel conditions. For cognitive radio communications, reliable spectrum sharing and sensing mechanism is also needed to ensure trustworthiness of the CR communications.

The present invention provides an adaptive Orthogonal Frequency Division Multiplexing (OFDM) system for providing a wireless or wireline network or communication platform that is adaptable to variable transmission parameters. The wireless or wireline communication network or platform may include a receiver and a transmitter, wherein the receiver and transmitter can adapt their communication link using a precoded cyclic prefix (PCP). It should be understood that the present invention is not limited to application in CR and variable-rate multimedia applications in particular.

In one aspect of the present invention, a wireless or wireline communication transmitter is provided, which may include a spectrum sensing unit and a controlling unit, operable to obtain characteristics of the environment and to adapt the transmission based on such characteristics. In another aspect of the present invention, a wireless or wireline communication receiver is provided operable to communicate with at least one wireless or wireline communication transmitter. The receiver of the present invention, in an example of the implementation thereof, may include: a synchronization utility; a buffer; a channel estimation and parameter selection unit; a fast Fourier transform unit; a frequency domain equalizer; an intra-carrier inference estimator; and an inter block interference estimator.

In one aspect of the invention, as explained below, the PCP may comprise at least one sequence comprising identification elements and signal parameter elements, the resulting PCP sequence being made available to the wireless or wireline network or communication platform to enable communication, or wireless or wireline network or device performance, that address variable transmission parameters. The PCP may represent one or more of spectrum sensing, sharing and bandwidth control, location information and transmission parameters. In one aspect of the present invention the PCP may be a Kasami sequence, as further explained below.

The present invention system provides for a flexible, robust and efficient platform for wireless or wireline transmission communications. In one aspect of the present invention the PCP provides an efficient way of tracing the source of a signal for interference control and standard compliant issues. In addition, fairness of spectrum sharing may be improved by sensing the usage of the available spectrum.

In another aspect of the present invention a common interface is provided to identify the information source of the wireless or wireline transmissions and convert it to a common standard readable by the adaptive OFDM transmitter. The OFDM receiver is also linked to a common interface utility that can covert the transmission to the appropriate communication standard.

The present invention provides for a method for adaptive communication signal communication on a wireless or wireline network comprising the following steps for transmission of an adaptive communication signal: (a) generating an Orthogonal Frequency Division Multiplexing (OFDM) transmission by combining at least one precoded cyclic prefix (PCP) and an adaptive OFDM symbol using system parameters encoded in the corresponding PCP; (b) transmitting the signal from at least one OFDM transmitter to at least one OFDM receiver; (c) demodulating the at least one PCP; and (d) demodulating the OFDM signal using the system parameters recovered from step (c).

The present invention further provides for a wireless or wireline transmission method comprising the steps of (a) detecting the communication environment or determining communication requirements, for communication on the wireless or wireline network; (b) determining the system parameter information for adaptive OFDM based on the communication environment or communication requirements; (c) encoding the system parameter information into at least one PCP sequence; (d) generating an OFDM symbol by combining at least one PCP sequence and an adaptive OFDM symbol using the system parameters encoded in the corresponding PCP; (e) transmitting the signal from at least one OFDM transmitter to at least one OFDM receiver; (f) demodulating the at least one PCP sequence; and (g) demodulating the OFDM signal using the system parameters recovered in step (f).

In one aspect of the present invention, one part of transmitting the signal includes determining the available bandwidth and transmission parameters using the spectrum sensing results from the controlling unit. Transmitting the signal may include the transmitter in accordance with the present invention identifying and differentiating the signals it is transmitting using the identification element of the PCP.

In another aspect of the present invention the signal transmitted would contain at least one PCP which comprises at least one sequence containing identification elements and signal parameter elements. With the signal parameter information sent with the signal data there is no need to resort to a handshaking procedure to establish a communication link.

In another aspect of the present invention the signal transmitter would include one additional PCP and a guard time before new PCP and OFDM symbol with new system parameter can be used.

In a further aspect of the present invention the signal parameter elements may be adapted to include information regarding the priority of the transmission. As one example of implementation of the present invention, the signal parameter elements may provided such that they include information that enables a first signal to be assigned priority over one or more second signals, for example by being given bandwidth priority for transmission and connectivity.

The present in invention also provides for a wireless or wireline device operable to generate a transmission comprising at least one PCP sequence and by operation of an OFDM transmitter, to transmit the transmission and, by operation of an OFDM receiver, to receive and transmission and demodulate the at least one PCP sequence.

In one aspect of the present invention, a plurality of wireless or wireline devices may be linked to one or more network servers for managing communications in a wireless or wireline network, the plurality of wireless or wireline devices being connectable to the network, the one or more network servers being operable to manage wireless or wireline communications between the plurality of wireless or wireline devices on the network based one or more communication rules implemented using the transmission/receiving method of the present invention.

The present invention further provides for machine readable application that may run on a wireless or wireline device and is adapted to generate a transmission comprising at least one PCP sequence and is operable to transmit the transmission as well as receive a transmission with at least one PCP sequence and is operable with an OFDM receiver to receive a transmission and is adapted to demodulate the at least one PCP.

The present invention meets a number of requirements presented by recent developments in cognitive radio and multimedia communications, including related technical challenges in the design robust adaptive transmission technique for these communication technologies.

The present invention method allows for overall spectrum efficiency to be improved due to the elimination of the preambles and handshaking signaling required when there is any change in the CR transmission parameters, in one implementation of the present invention. There is a need for improvement in the spectrum efficiency can be substantial due to the fast-varying nature of the CR channel conditions, including the carrier frequency and bandwidth of the available spectrum. In the present invention, the identification element of the PCP is assigned uniquely to each CR transceiver as identification label for the OFDM signal transmitted from a CR. Consequently, the PCP can be used as sensing characteristics for spectrum sharing among cognitive radios.

The present invention method also allows for the power consumption at the transmitter side to be reduced through receiver-transmitter interaction using PCP signaling link. The power efficiency of the wireless transmitter can be improved with the PCP-OFDM for heterogeneous multimedia communications due to the dynamic communication needs.

The present invention method may also have key applications within wireline communications, including DSL or digital cable communications. By adapting each user's bandwidth and transmission power, the crosstalk noise among users may be minimized.

The present invention also provides for an adaptive Orthogonal Frequency Division Multiplexing (OFDM) system for providing a wireless or wireline network or communication platform that is adaptable to variable transmission parameters and comprises a receiver and a transmitter, wherein the receiver and transmitter can adapt their communication link using a precoded cyclic prefix.

The present invention further provides for a wireless or wireline device operable to generate a transmission comprising at least one precoded cyclic prefix and by operation of an OFDM transmitter, to transmit the transmission, demodulated the PCP, and by operation of an OFDM receiver, to receive the transmission.

In one aspect of the present invention a plurality of wireless or wireline devices linked to one or more network servers for managing wireless communications in a wireless or wireline network, the plurality of devices being connectable to the wireless or wireline network, the one or more network servers being operable to manage wireless or wireline communications between the plurality of wireless or wireline devices on the wireless or wireline network based one or more communication rules implemented using the wireless transmission method comprising the steps of: (a) generating a transmission comprising at least on precoded cyclic prefix (PCP) using an adaptive Orthogonal Frequency Division Multiplexing (OFDM) system; (b) transmitting the signal from an OFDM transmitter to an OFDM receiver; and (c) demodulating the at least one PCP.

The present invention provides for a machine readable application that is operable to run on a wireless or wireline device and is adapted to generate a transmission comprising at least one PCP sequence and is operable to transmit the transmission as well as receive a transmission with at least one PCP sequence and is operable with an OFDM receiver to receive a transmission and is adapted to demodulate the at least one PCP.

1). Flexible and robust wireless transmission techniques. The available communication channel for cognitive radio may be hostile. On one hand, available spectrum for CR is often corrupted with strong co-channel and adjacent-channel interference from existing licensed communication systems. The present invention provides a wireless CR transmission technique that is robust in handling strong interferences. In the meantime, it is flexible and efficient in achieving higher system capacity with varying channel conditions. The present invention supports making variable bandwidth available to higher system capacity. In addition, in connection with fasting variation of the carrier frequency and bandwidth for the available spectrum, the present invention enables adjustment of transmission and receiving parameters in a fast and efficient manner.

2). Reliable spectrum sharing and sensing techniques. The successful deployment of CR networks and the realization of their benefits depend on the reliable and fair spectrum sharing mechanism. Consider the following two scenarios. If a CR user detects the presence of incumbent signals in the current band, it must immediately switch to one of the fellow candidate bands. On the other hand, if the secondary user detects the presence of an unlicensed user, it should either switch to another available spectrum or invoke a coexistence mechanism to share spectrum resources. The first case depends on the trustworthiness of the spectrum sensing of the primary user. Since the primary users' usage of licensed spectrum bands can be sporadic, a CR preferably monitors for the presence of incumbent signals in the current operating band and candidate bands. The second scenario indicates a transmitter identification signal should be introduced to the cognitive radio for spectrum sharing and monitoring purposes.

3). Interference control for regulation compliant issues. In traditional wireless communication systems, algorithms for system management, such as power control and channel selection, are implemented in many radio devices, but may be vendor-specific and invisible to the outside world, particularly the spectrum regulators. As a result, today's standards and regulations may constrain parameters like power levels and frequency ranges for operation, to achieve a minimum level of interference to the primary user and secondary users. The unique characteristic of cognitive radios on the other hand is that their radio resource management algorithms are weakly constrained by standards or regulation. This implies that the entire decision-making in spectrum management should be visible to the outside world, and signals transmitted from a CR should be traceable to minimize the interference to incumbent signals. In addition, transmission system parameters of each CR should also be transparent to other CR users to minimize the mutual interference and reliable transmission.

There is a need to address the aforementioned challenges with the proposed adaptive OFDM systems by using PCP. OFDM is envisioned as a key technology for broadband wireless communications due to its high spectral efficiency and robustness to multipath distortions [11-14]. There is a further need for the proposed PCP-OFDM to provide a flexible, robust, and efficient platform specifically tailored for cognitive radio communications.

The precoded cyclic prefix, in one implementation of the present invention, using two Kasami sequences precoded by the transmitter identification and transmission system parameters, provides in one aspect of the invention several important functionalities for cognitive radio. Besides PCP's basic role as a guard interval to eliminate intersymbol interference (ISI), transmission system parameters including the total number of the OFDM subcarriers, carrier frequency, and modulation and coding schemes can be sent concurrently with any OFDM symbol. The present invention enables avoidance of the tedious handshaking procedure to establish a communication link.

Further, PCP provides an efficient way of tracing the source of any CR signal for interference control and standard compliant issues. Fairness of spectrum sharing could be improved by sensing the usage of the available spectrum. In addition, Time Division Duplexing (TDD) technique could be used in PCP-OFDM for the partition of the uplink and downlink of the CR communications. Channel conditions for uplink and downlink will use the same frequency and experiences similar multipath distortions. As a result, spectrum management and adaptation of the physical layer is much easier. By changing the duplexing ratio of the TDD scheme, different data rates for uplink and downlink can be supported. This is of great importance as future communication data can take different form with large variation in its data rate. The multiple functionalities of the PCP make the new OFDM system ideal for the cognitive radio communications.

I. OFDM Systems with Pseudo-Random Sequence as Cyclic Prefix

The present invention provides a solution for the challenges associated with CR and variable rate multimedia communications with the implementation of an adaptive Orthogonal Frequency Division Multiplexing (OFDM) system, with a precoded cyclic prefix (PCP). The PCP, in one aspect of the invention, as stated earlier, is combined from two precoded Kasami sequences as its signal data and signal parameter elements, and can be used for several specific purposes related to cognitive radio, in one implementation of the present invention. Besides the basic function as a guard interval for the OFDM systems, the signal parameter element of PCP provides an efficient way of sending the transmission system parameters of the transmitter to the receivers. These parameters can include the bandwidth, total number of OFDM subcarriers, modulation and coding schemes used. Variable data rate transmission for multimedia communications can be easily supported by the proposed PCP-OFDM system.

The present invention provides for a method as illustrated in FIG. 1, in one aspect of the invention and as explained above. FIG. 1 further illustrates the method according to one embodiment of the present invention comprising the steps of (a) detecting the communication environment or determining communication requirements, for communication on the wireless or wireline network (100); (b) determining the system parameter information for adaptive OFDM based on the communication environment or communication requirements (101); (c) encoding the system parameter information into at least one PCP sequence (102); (d) generating an OFDM symbol by combining at least one PCP sequence and an adaptive OFDM symbol using the system parameters encoded in the corresponding PCP (103); (e) transmitting the signal from at least one OFDM transmitter to at least one OFDM receiver (104); (f) demodulating the at least one PCP sequence (104); and (g) demodulating the OFDM signal using the system parameters recovered in step (f) (106).

In one aspect of the present invention, communication environment may include available spectrum bandwidth used for transmission, channel conditions (channel variation, interference strength, noise level). Communication requirement may include data rate to be supported, transmission quality and accuracy requirement in term of transmission symbol error rate, multiple streams concurrent transmission, etc.

Figure 2:
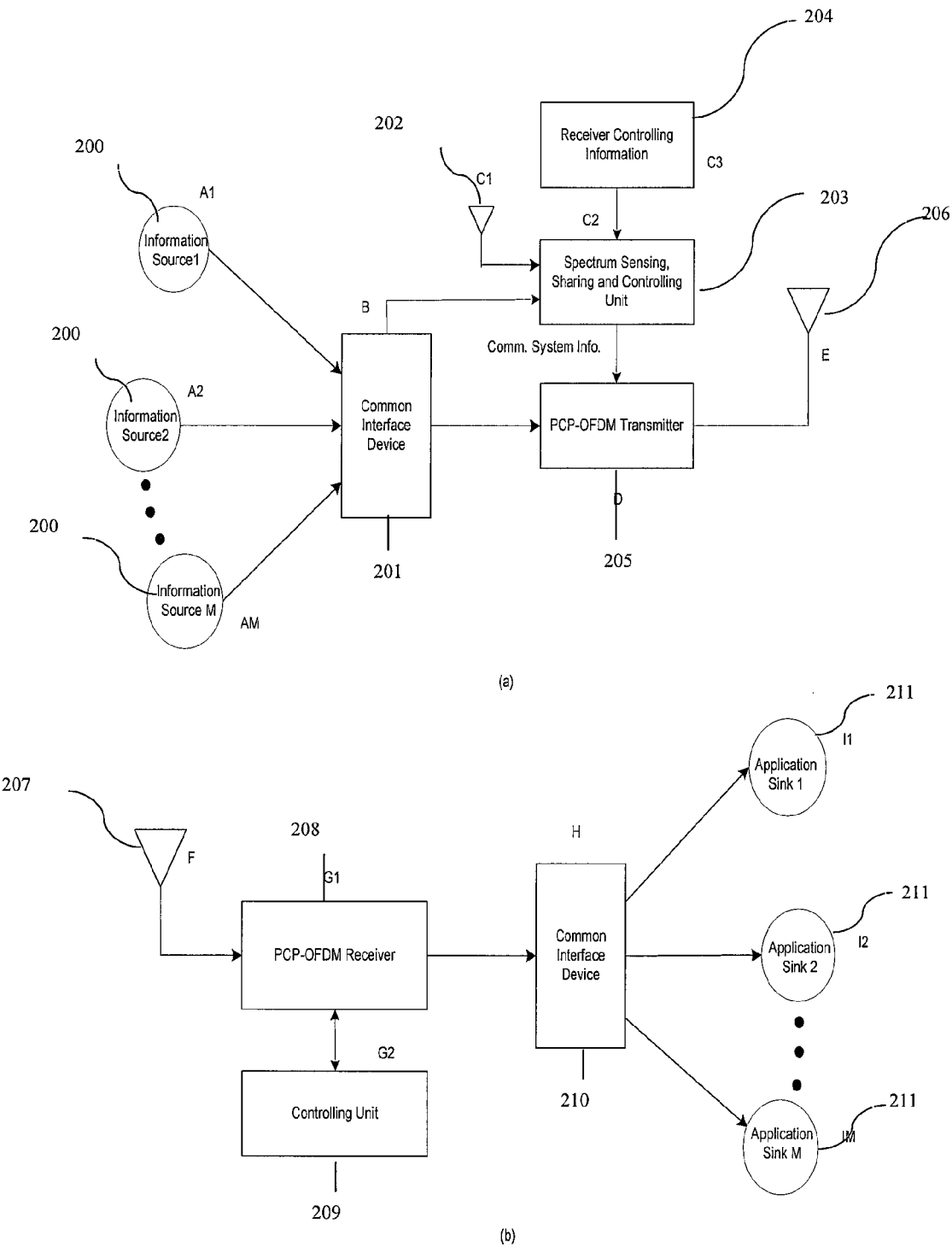
FIG. 2(a) illustrates the transmitting of a wireless transmission with the common interface utility according to one embodiment of the present invention.
FIG. 2(b) illustrates the receiving of a wireless transmission with the common interface utility according to one embodiment of the present invention.

The OFDM wireless and wireline transmission method is further illustrated in FIG. 2. FIG. 2(a) shows the wireless transmitter side, while FIG. 2(b) illustrates the receiver side. For multimedia communications, each information source (200) may be a binary bit stream from one specific source, for example speech, data and video sources. An example of the use of the method in the present invention is in a health care application, each information source is the digitized information from medical sensors such as temperature and heart rate and other binary information sources including audio and video streams for remote doctor-patient interaction.

In one aspect of the present invention, the transmitter may receive the incoming information from one or a plurality of information sources (200). The common interface device (201) will identify the transmission protocol and packing format. The interface unit (201) may further remove the format related data from the input and forward the incoming data to the PCP-OFDM transmitter (205) and spectrum sensing and controlling unit (SSCU) (203). The spectrum sensing and controlling unit (203) may also be equipped with a receiving antenna (202). The spectrum sensing and controlling unit (203) may decide the bandwidth and transmission parameter, depending on the incoming data rates, as well as the channel conditions from the sensing results. Multiple incoming data streams may be combined into one single stream by this unit.

In another aspect of the present invention, the spectrum sensing and controlling unit (203) will decide the available bandwidth from spectrum sensing results, the data rate needs to be transmitted, and input from the receiver controlling information unit (204). This unit (204) may further decide the transmission bandwidth and transmission information to PCP-OFDM transmitter (205). The signaling information which the transmitter would like to send to the receiver will be generated in this block.

The PCP-OFDM signal may be generated in the wireless or wireline transmitter (205), using the information from the SSCU (203). FIG. 2(a) further illustrates the PCP-OFDM signal may be transmitted using the transmitting antenna (206).

Once the transmission has been transmitted it may be received using the wireless or wireline transmission receiving procedure as illustrated in FIG. 2(b). The signal from the wireless or wireline transmitter (205) may be picked up using antenna (207). The PCP signaling information and transmitted data may be recovered using the wireless or wireline PCP-OFDM receiver (208), depending on the controlling information from the controlling unit (209).

In another aspect of the present invention, the receiver (208) may also report to the controlling unit (209) the receiving performance of the wireless communication receiver (208). The controlling unit (209) may decide the receiving algorithm used in the receiver (208). The controlling unit (209) may also determine any feedback information, including but not limited to power control information, to the remote transmitter through the PCP signaling link between the local transmitter and remote receiver. The recovered data from the OFDM signal from the local receiver (208) may be converted to certain format by the common interface unit (210), depending the transmission protocol and applications. For combined data stream by the transmitter (205), the common interface unit (210) may divide the combined data stream back to multiple forms. The recovered data streams will be sent to one or a plurality of application sinks (211).

An aspect of the present invention provides for the common interface (201) to also have the capability of combining different data stream into one data stream for transmission at the transmitter side, and separating each individual data stream at the receiver side. The application sink (206) may be speaker, display devices, or other mechanical devices.

The power consumption at the wireless transmitter side of the wireless communication network or wireless communication platform may be reduced using the present invention in two ways. First, depending on the data rate to be transmitted, the transmitter adjusts its transmission bandwidth on its own. The transmission parameters will be sent to the wireless receiver through PCP signaling. Second, the wireless receiver evaluates the signal to noise ratio of the received signal and sends feedback information to the transmitter through its PCP signaling link. The wireless transmitter may then adjust its transmission power accordingly.

Figure 3:
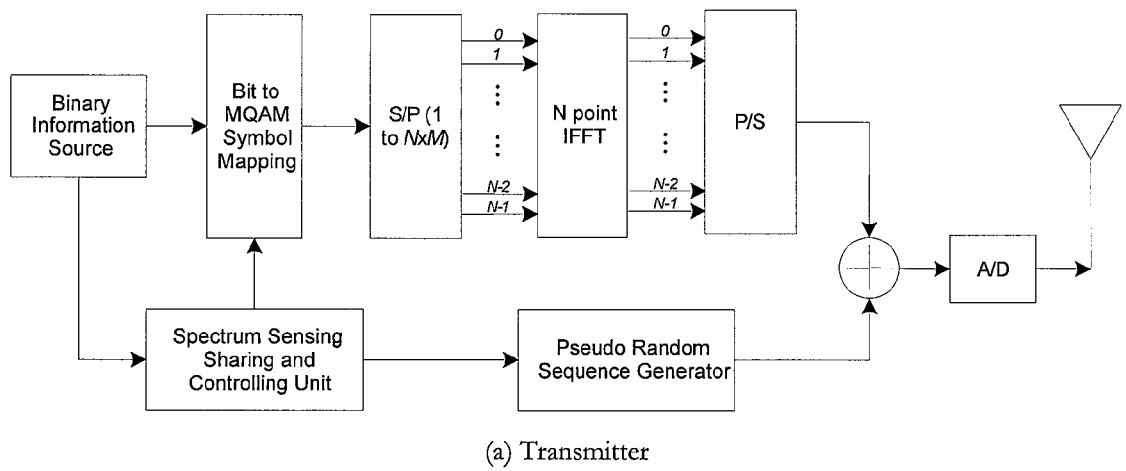
FIG. 3(a) illustrates a transmitter according to one embodiment of the present invention.
FIG. 3(b) illustrates a receiver according to one embodiment of the present invention.
Figure 3:
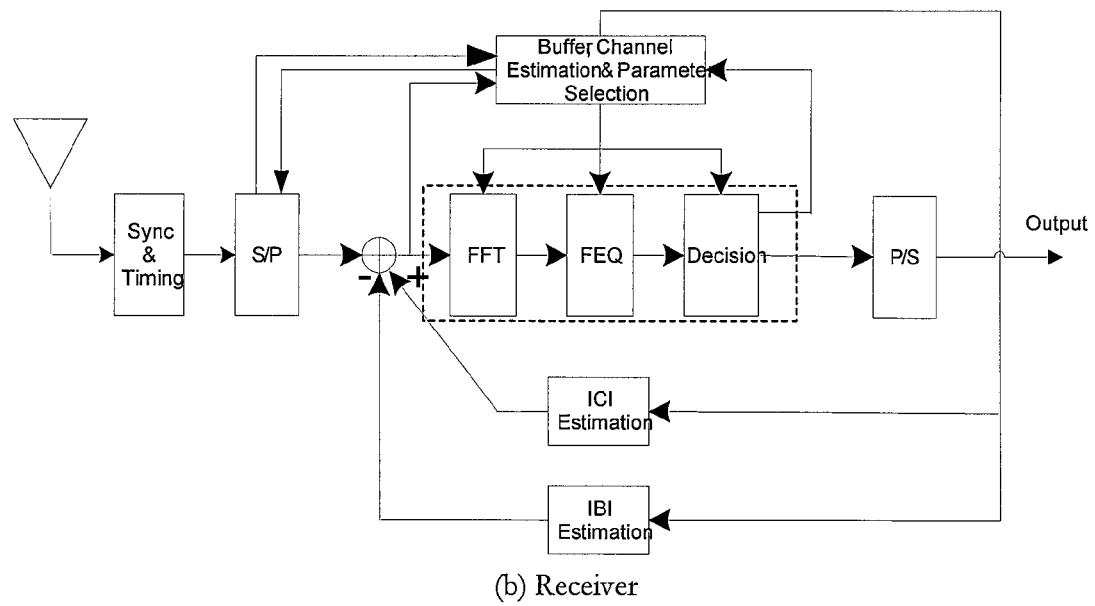

FIG. 3 illustrates in block diagram form one embodiment of the PCP-OFDM system. The wireless communication transmitter in FIG. 3(a) contains a system similar to the traditional OFDM system, but with the added feature of the cyclic prefix is now replaced by a precoded cyclic prefix which may comprise of at least one sequence. The transmitter would include one additional PCP and a guard time before new PCP and OFDM symbol with new system parameter can be used. The transmitted signal can have variable bandwidth by changing the size of the inverse Fourier transform, which is controlled by the SSCU. Pseudo random sequence or zero sequence have been used in OFDM as prefix and postfix to protect OFDM symbol from ISI [15, 16].

As stated earlier, the PCP may be combined from two Kasami sequences, precoded by the wireless or communication transmitter identification and system parameters. The same PCP is used as the cyclic prefix for all the forthcoming OFDM symbols unless there is change in the transmission system parameters. The generation of the pseudo random sequence and consequently the precoded cyclic prefix may be controlled by the spectrum sensing, sharing and controlling unit (SSCU).

In another aspect of the present invention, the identification element of the PCP represents the transceiver identification and signal parameter element is precoded for the transmission of OFDM system parameters including the number of the subcarriers and the modulation/coding schemes used. In addition, the size of inverse fast Fourier transformation (IFFT) block, i.e. the number of subcarriers of adaptive OFDM modulator, may also be controlled by SSCU. The total number of the subcarriers in the OFDM signal and its carrier frequency depends on the information of the available spectrum from the spectrum sensing, sharing and controlling unit. The number of the subcarriers as well as the coding and modulation schemes may be coded into a different cyclic prefix. Generation and detection of such a PCP is further discussed below.

The following sets out an example of implementation of the present invention:

Each OFDM symbol at the output of FIG. 3 (a) may be specified by an N-point time-domain vector x obtained via an IFFT of the complex data vector X of size N. Without loss of generality, each OFDM symbol in time domain can be expressed in vector form as $$x = F_N^H X, \quad (1)$$

where $F_N^H = F_N^{-1}$ is the inverse Fourier Transform matrix with its (n, k)th entry $(\exp\{j2\pi nk/N\}/\sqrt{N})$. Operator $(\cdot)^H$ denotes conjugate vector/matrix transposition.

In one aspect of the present invention, before the transmission of the OFDM symbol in (1), the generated PCP sequence with length of P is inserted as its prefix. The duration of the pseudo random length should be longer than or at least equal to the channel delay spread for a complete removal of ISI during the demodulation process. It should be noted that in the one embodiment of the present invention the system contains the beginning of the CR communication starts with one precoded cyclic prefix. This may be equivalent to generating a new OFDM symbol of N+2P samples with one pseudo random sequence as its last P samples and the other sequence as its cyclic prefix in the first P samples. Consequently, the cyclic structure for each PCP-OFDM symbol may be produced since the pseudo random sequence may be used as cyclic prefix for all the OFDM symbols. As a result, it creates a series of new OFDM symbols of (N+P) samples with cyclic structure similar to traditional OFDM symbols protected by cyclic prefix.

Without loss of generality, consider the following signal vector for interference analysis and PCP-OFDM symbol demodulation $$x' = [C_P(0), C_P(1), \ldots, C_P(P-1), x(0), x(1), \ldots, x(N-1), C_P(0), C_P(1), \ldots, C_P(P-1)]^T. \quad (2)$$

Now let N'=N+P and vector r' be the received signal vector corresponding to the transmitted signal vector x' in (1). Unless otherwise stated, assume an L-tap static complex channel $h = [h_0, h_1, \ldots, h_{L-1}]^T$ for signal propagation and interference analysis, with the worst case L=P. The received signal r'cor responding to the transmitted signal vector x' can be expressed as $$r' = \begin{bmatrix} h_0 & 0 & \cdots & \cdots & \cdots & 0 \\ h_1 & h_0 & & & & \vdots \\ \vdots & \ddots & \ddots & \ddots & & \vdots \\ h_{L-1} & \cdots & h_1 & h_0 & \ddots & \vdots \\ 0 & \ddots & & \ddots & \ddots & 0 \\ \vdots & & h_{L-1} & \cdots & h_1 & h_0 \\ \vdots & & & \ddots & h_{L-1} & \cdots & h_1 \\ \vdots & \ddots & & & \ddots & \vdots \\ 0 & \cdots & \cdots & \cdots & 0 & h_{L-1} \end{bmatrix} \cdot x' + w', \quad (3)$$

where the size of the channel matrix in (3) is (N+3P−1)×(N+2P), and w' is an additive white Gaussian noise (AWGN) vector with the same size as r'. Suppose the channel impulse response of the channel is known through channel estimation, a straightforward way to obtain the equalized signal $\tilde{x}'$ with size of (N+P) in time domain can be formulated as $$\tilde{x}' = F_{N+L}^H D^{-1}(H') F_{N+L} r'_{N+L} + \tilde{w}_{N+L}^{FEQ}, \quad (4)$$

where $r'_{N+L}$ is the [N+P+1: N+2P] samples from the received signal r' and $H' = DFT_{N+L}(h)$. $D(H')$ is the diagonalized channel matrix with the frequency channel response as its diagonal elements. The desired equalized OFDM symbol $\tilde{x}$ is the first N samples of $\tilde{x}'$. The demodulation process may be $$\tilde{X} = DFT_N(\tilde{x}) + \tilde{W}^{FEQ}. \quad (5)$$

The complexity associated with the demodulation process for the proposed PCP-OFDM using (4) and (5) is much higher than in a traditional OFDM system. Compared to an N-point traditional OFDM symbol demodulation process, one extra (N+P)-point IFFT and one (N+P)-point FFT are required in (4). These addition are because the frequency domain equalization is done on an OFDM symbol with size of (N+P). IFFT/FFT with very large size can be used for cognitive radio communications due to the dynamic range of available bandwidth and other channel conditions. Consequently, the increase in the demodulation complexity of the PCP-OFDM symbol could be substantial. There is a need therefore to develop a wireless and wireline communication receiver with reduced complexity that is comparable to the traditional OFDM receiver. FIG. 3(b) illustrates a wireless receiver structure for the PCP-OFDM system according to one embodiment of the present invention.

Figure 4:
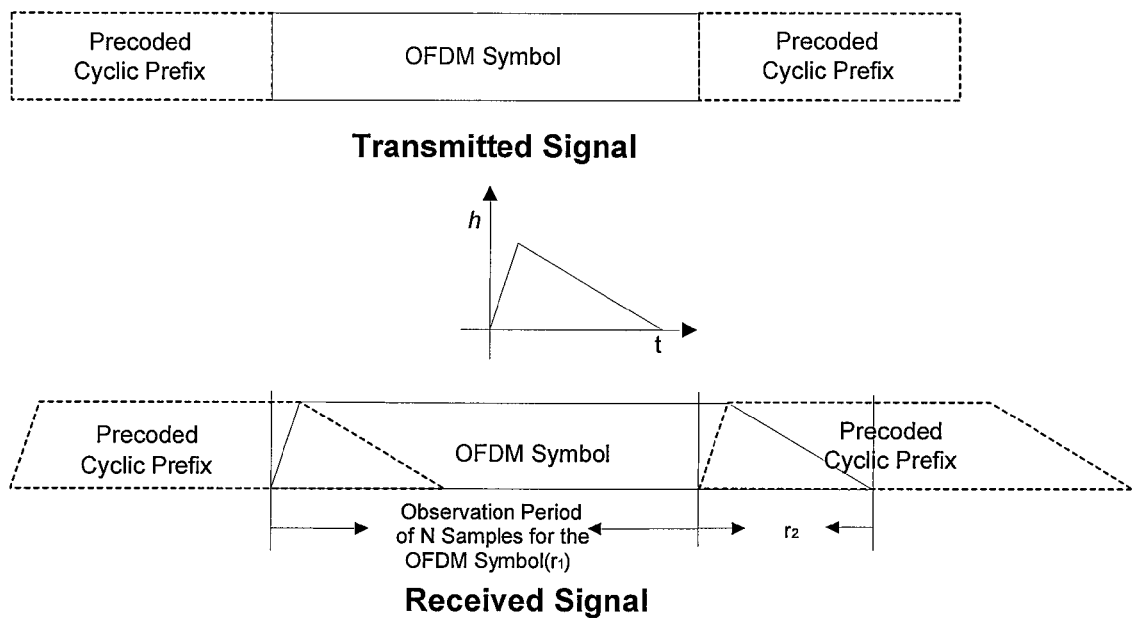
FIG. 4 illustrates signal propagation of one OFDM symbol and its neighboring PCPs according to one embodiment of the present invention.

In one aspect of the present invention, an interference analysis is presented below for the development of the wireless or wireline receivers according to one embodiment. FIG. 4 depicts a static multipath channel and the received wireless communication signal over one PCP-OFDM symbol and two adjacent PCP in (2). As highlighted by the shaded region in the FIG. 4, the transmitted signal appearing at the receiver may be spread by the multipath channel, resulting in ISI. The interferences from the adjacent blocks may have to be cancelled for the successful demodulation of the symbol.

As illustrated in FIG. 4, only N samples in the observation periods (OP) may be considered in the present embodiment of the wireless receiver for the demodulation of the PCP-OFDM symbol. The same OP is normally used in a conventional OFDM receiver. The exact location of OP and the channel length may be determined using the techniques in [17, 18] although alternative techniques are considered. As a result, ISI from the preceding PCP sequence may have to be estimated and cancelled. With estimated channel impulse response, IST may be computed and subtracted from the received signal. However, the inter carrier interference (ICI) still needs to be canceled due to the elimination of the cyclic structure in the OFDM signal when only N samples of the received signal are used for the demodulation process.

For the signal analysis purpose, construct two N×N matrices for the ISI and ICI analysis. The first matrix $$C = \begin{bmatrix} h_0 & 0 & \cdots & 0 & 0 & \cdots & 0 \\ h_1 & h_0 & \cdots & 0 & 0 & \cdots & 0 \\ \vdots & \vdots & \ddots & \vdots & \vdots & \ddots & 0 \\ h_{L-1} & h_{L-2} & \cdots & h_0 & 0 & \cdots & 0 \\ 0 & h_{L-1} & \cdots & h_1 & h_0 & \cdots & 0 \\ \vdots & \vdots & \ddots & \vdots & \vdots & \ddots & \vdots \\ 0 & 0 & \cdots & 0 & h_{L-1} & \cdots & h_0 \end{bmatrix}, \quad (6)$$

represents the channel seen by the OFDM symbol. The second matrix $$C_T = \begin{bmatrix} 0 & \cdots & 0 & h_{L-1} & h_{L-2} & \cdots & h_1 \\ 0 & \cdots & 0 & 0 & h_{L-1} & \cdots & h_2 \\ \vdots & \ddots & \vdots & \vdots & \vdots & \ddots & \vdots \\ 0 & \cdots & 0 & 0 & 0 & \cdots & h_{L-1} \\ 0 & \cdots & 0 & 0 & 0 & \cdots & 0 \\ \vdots & \ddots & \vdots & \vdots & \vdots & \ddots & \vdots \\ 0 & \cdots & 0 & 0 & 0 & \cdots & 0 \end{bmatrix}, \quad (7)$$

represents the tail end of the channel's impulse response that generates ISI in the succeeding symbol. These two matrices have the interesting property of $$C + C_T = C_{cycl}, \quad (8)$$

where $C_{cycl}$ is the "ideal" channel matrix, i.e. the matrix that results in a cyclic convolution between the transmitted signal and the channel. Based on (3)-(7), received signal (N samples) for the OFDM symbol in OP can be expressed as $$r = Cx + C_T c_P + w. \tag{9}$$

To use the similar demodulation procedure for traditional OFDM system, the following ideal received signal vector is constructed:

$$r_i = r_1 - C_T c_P + C_T x, \tag{10}$$

where $$r_1 = [r'(P+1), \ldots, r'(P+N)]^T. \tag{11}$$

The signal structure depicted in (10) suggests that the first step of the proposed hybrid domain receiver in demodulating x is to remove the ISI term by subtracting the ISI $C_T c_P$ from the preceding PCP sequence. For any reasonable channel signal-to-noise ratio (SNR) of interest, the error from the estimated channel is very small and hence there will be reliable ISI cancellation. After ISI removal, the next step is to remove the ICI term, or equivalently to perform cyclic reconstruction for the received PCP-OFDM signal. This could be done iteratively as any attempt of ICI removal should be based on a temporary decision for the OFDM symbol. However, the computation complexity associated with this iterative approach is enormous since the ICI cancellation is in time domain and the demodulation the OFDM symbol is in frequency domain. The conversion any signal from time to frequency or from frequency to time domain will depend on Fourier transformation.

An alternative approach may be an ICI cancellation approach totally in time domain. Consider the propagation of the PCP-OFDM symbol only shown in FIG. 4. When $r_1$ is used for the demodulation of the PCP-OFDM symbol, the remaining tail from the PCP-OFDM symbol is actually the signal needed to reconstruct the cyclic signal structure. To do this, the tail signal is derived from the following received signal vector of N samples, $$r_2 = [\underbrace{r'(P+N+1), \ldots, r'(2P+N-1)}_{(P-1)\text{ Samples}}, \underbrace{0, \ldots, 0}_{(N-P+1)\text{ Samples}}]^T \tag{12}$$

If the signal component from the second PCP is subtracted from (12), the desired ICI signal will be obtained [16]

$$n_{ICI} = r_2 - C_H c_{P:N}. \tag{13}$$

where the (N×N) matrix $C_H$ is $$C_H = \begin{bmatrix} h_0 & 0 & \ldots & 0 & 0 & \ldots & 0 \\ h_1 & h_0 & \ldots & 0 & 0 & \ldots & 0 \\ \vdots & \vdots & \ddots & \vdots & \vdots & \ddots & 0 \\ h_{L-2} & h_{L-3} & \ldots & h_0 & 0 & \ldots & 0 \\ 0 & 0 & \ldots & 0 & 0 & \ldots & 0 \\ \vdots & \vdots & \ddots & \vdots & \vdots & \ddots & \vdots \\ 0 & 0 & \ldots & 0 & 0 & \ldots & 0 \end{bmatrix}. \tag{14}$$

Now the ideal signal for the demodulation of the PCP-OFDM symbol can be derived using $$r_i = r_1 - C_T c_P + r_2 - C_H c_{P:N}. \tag{15}$$

When the channel estimate is accurate, the ideal signal in the above equation becomes $$r_i = C_{cycl} F_N^H X \tag{16}$$

As for the OFDM system with cyclic prefix, the circulant matrix $C_{cycl}$ can be diagonalized by N×N (I)FFT matrices [16]. For the demodulation purpose, applying a FFT matrix to the above equation leads to $$F_N r_i = F_N C_{cycl} F_N^H X = D_N(\tilde{H}_N) X. \tag{17}$$

where $D_N(\tilde{H}_N)$ is the N×N diagonal matrix with the estimated frequency domain transfer function as its diagonal elements. As the result, the complete zero-forcing demodulation process is $$\tilde{X} = D_N^{-1}(\tilde{H}_N) F_N r_i. \tag{18}$$

II. System Parameters Transmission Using Pseudo Random Sequences as the Cyclic Prefix As mentioned above, one difficulty for the future cognitive radio as well as other wireless and wireline communication transmissions are the frequent change of the system parameters due to the fast variation of the spectrum availability and channel conditions. Therefore an efficient way of providing transmission system parameters to the desired wireless or wireline receiver can improve the efficiency of the wireless communications systems, platforms and networks.

A handshaking procedure similar to that used in licensed communications may be difficult to achieve due to the unknown spectrum and transmission conditions. It is therefore preferred that the wireless transmission system parameters be transmitted in a self-contained or concurrent manner with PCP-OFDM signals. In addition, reliable identification of each signal from cognitive radio or other wireless transmission device may also be needed for interference monitoring by authorities. In this section one aspect of the present invention, the use of a precoded cyclic prefix is discussed.

In one aspect of the present invention, the complex PCP may be combined from two independent Kasami sequences. Other sequences are contemplated. The Kasami sequences may contain identification elements and signal parameter elements which may be used to transmit the system parameters of the cognitive radio as well as the CR transmitter identification. It should be noted that application of the present invention is not limited to CR communications.

Selection of the PCP Sequence or Signals

A wide variety of signals and sequences can be used as PCP, as long as they meet the previous discussed requirements. Also, one desired property of the PCP is its orthogonality or near-orthogonality, i.e., a very low cross-correlation function between different PCPs. The other requirement is the number of the available PCPs in the design.

Any signal or sequence with abovementioned properties can be used in PCP-OFDM. However, for the simplicity of the wireless system design, pseudo random sequences are preferred. Different pseudo random sequences, including (but not limited to), m-sequences, Gold and Kasami sequences are good candidates as they can provide large family of the orthogonal sequences. A brief introduction of the generation of Gold and Kasami sequence is given as follows. Sample generators for these sequences are plotted in FIG. 5.

The generator of Gold sequence and Kasami sequence are summarized as follows:

Properties of Kasami Sequences.

One property of the Kasami sequences is the excellent auto-correlation and cross-correlation properties [19-22]. In addition, Kasami sequences provide a large family of orthogonal codes that may be used to indicate various CR or other wireless communication transceivers and system parameters [21]. The identification element of the PCP is uniquely assigned to each wireless communication transmitter for transmitter identification purpose. The transmission parameters of the wireless signal, including the number of the subcarriers of the OFDM signal, modulation and coding schemes may be coded into the second Kasma sequence as the signal parameter element of the PCP. This process may be similar to code shift keying [23, 24].

Kasami sequence sets are one of the important types of binary sequence sets because of their large set size and very low cross-correlation. There are two classes of Kasami sequences: the small set and the large set. The large set contains all the sequences in the small set. Since it will be used as cyclic prefix for PCP-OFDM, Kasami sequences have a period of $P=2^n-1$, where n is a nonnegative, even integer.

Let u be a binary sequence of length P, and let w be the sequence obtained by decimating u by $2^{n/2}+1$. The small set of Kasami sequences is defined by the following formulas, in which D denotes the left shift operator, and $\oplus$ denotes addition modulo 2 [21], $$K_s(u) = \{u, u \oplus w, u \oplus Dw, \ldots, u \oplus D^{2^{2}-2}w\}. \quad (19)$$

Note that the small set of contains $2^{n/2}$ sequences. Let v be the sequence formed by decimating the sequence u by $2^{n/2+1}$. For mod(n, 4)=2, the large set of Kasami sequences is defined as follows [21]

$$K_L(u) = G(u, v) \cup \left[ \bigcup_{i=0}^{2^{n/2}-2} \{D^i w \oplus G(u, v)\} \right], \quad (20)$$

where G(u,v) is the Gold sequence $$G(u,v) = \{u, u \oplus v, u \oplus Dv, \ldots, u \oplus D^{N-1}w\}. \quad (21)$$

The correlation functions for the Kasami sequences take on the values [21]

$$\{-t(n), -s(n), -1, s(n)-2, t(n)-2\}, \quad (22)$$
where $$t(n) = 1 + 2^{\frac{n+2}{2}}, \quad (23)$$
and $$s(n) = \frac{1}{2}[t(n)+1]. \quad (24)$$

Properties of the Gold Sequence

The Gold sequences are defined using a specified pair of sequences u and v, of period $N=2^n-1$, called a preferred pair, defined as:

N is not divisible by 4, v=u[q], where q is odd with $q=2^k+1$ or $q=2^{2k}-2^k+1$. This indicates that v can be obtained by sampling every q-th symbols of u.

The set G(u, v) of Gold sequences is defined by $G(u,v) = \{U, V, u \oplus v, u \oplus Tv, u \oplus T^2 v, \ldots, u \oplus T^{N-1} v\}$ where T represents the operator that shifts vectors cyclically to the left by one place, and $\oplus$ represents addition modulo 2. Note that G(u,v) contains N+2 sequences of period N, which are orthogonal to each other and may be used for transmitter identification purpose. Having found a preferred pair, the actual Gold codes can be generated using two shift registers as shown in the FIG. 5(b). Note that at least one element of the Initial states vectors must be nonzero in order for the block to generate a nonzero sequence. That is, the initial state of at least one of the registers must be nonzero.

The Gold Sequence Generator block outputs one of these sequences according to the block's parameters.

One Embodiment of the PCP Using Complex Kasami Sequences

The complex PCP, combined from two independent Kasami sequences as its identification element and signal parameter element, can be used to transmit the system parameters of the cognitive radio as well as the CR transmitter identification. One property of the Kasami sequence is its excellent auto-correlation and cross-correlation properties [19-22]. In addition, Kasami sequences provide a large family of orthogonal codes that can be used to indicate different CRC transceivers and system parameters [21]. The identification element parts of the PCP, is uniquely assigned to each CR transmitter for transmitter identification purpose. The transmission parameters of the CR signal, including the number of the subcarriers of the OFDM signal, modulation and coding schemes are coded into the second Kasami sequence as the signal parameter element of the PCP, which is similar to code shift keying [23, 24].

Precoded Cyclic Prefix with Kasami Sequecnes. Two Kasami sequences may be used to generate the precoded cyclic prefix according to $$c_P = c_{P,r} + jc_{P,i}. \quad (25)$$

Note here all elements in the pseudo random sequences in (25) take on values +1 or −1. This is to avoid any direct current (DC) component in the transmitted signal. As mentioned above, the identification element of the cyclic prefix, $c_{P,r}$, will be used as the identification of cognitive radio, while the signal parameter element $c_{P,i}$ will be used to transmit the system parameters. The generation of each Kasami sequences is shown by the sample generator in FIG. 5(c). In this figure, the boxes represent shift register units, and $\oplus$ represents modulor-2 adder or exclusive-OR gate. In one aspect of the present invention, the precoded cyclic prefix may use a large set Kasami sequence; both the signal data and signal parameter element of the PCP has $M=2^{n/2+1}(2^n+1)$ different sequences.

In another aspect of the present invention, the identification element of the cyclic prefix may be uniquely assigned as the identification of the cognitive radio. Signals from each cognitive radio can then be easily traced back to its sourcing transmitter for spectrum monitoring and sharing purposes. With the M possible sequences for the signal parameter element, it is therefore possible to transmit $\log_2 M \approx 1.5$ n bits for the cognitive radio parameters. This approach is similar to coded shift keying [References] and should be understood that it is not limited to application in CR. The input data sequence is denoted as $$d = [d_0, d_1, \ldots, d_{1.5n-1}] \quad (26)$$

where $d_i \in \{0, 1\}$. Each data sequence of system parameters thus may be associated with one unique Kasami sequence.

As illustrated in FIG. 5(c), the initial state of first shift register is fixed to a nonzero sequence, and the second and third shift registers are set to:

$$d_1 = [d_0, d_1, \ldots, d_{n-1}] \quad (27)$$

and $$d_2 = [d_n, d_{n+1}, \ldots, d_{1.5n-1}] \quad (28)$$

For instance, it is possible to transmit nine bits of system information using Kasami sequence when n=6. If the first two bits of d in (26) are used to indicate the number of the subcarriers, four different sizes can be used. Similarly, information of four modulation and four coding schemes can be transmitted using the $d_2$ $d_3$ and $d_4$ $d_5$. The remaining bits may be used for error coding or indicating the order of the OFDM symbol when the system information should be transmitted over several different OFDM symbols.

An alternative way of using the system parameter information may be to let each different d represents a different pre-determined wireless transmission platform; with each platform having its own combination of OFDM subcarriers, bandwidth, coding schemes etc. As an example, the large Kasami set with n=6 provides 512 different transmission options for CR and other wireless or wireline communications.

Synchronization, Transmitter Identification, and Demodualtion of the PCP.

The transmitter's identity, i.e. the identification element of the watermark, will keep the mobile receiver synchronized all the time. This may be achieved through M correlating operations. Each of the correlation for the received signal begin from the kth sample is $$C_m(k) = \sum_{l=0}^{P-1} c_{P,r,m}(l) r^*(k+l), m = 0, 1, \ldots, M-1 \quad (29)$$

where $c_{P,r,m}$ is a local generated Kasami sequence and m is the transmitter identification associated with it.

In one aspect of the present invention, the above correlation in (29) may be computed over an observation period longer than one PCP-OFDM symbol, with M correlations for each sample. The computation complexity associated with this process can be as high as MNP complex multiplications. However, the cyclic nature of the PCP-OFDM signal (with period of N and PCP length of length P) provides a straightforward way to achieve time synchronization, as the correlation function $$C_r(k) = \sum_{l=0}^{P-1} r(k+l) r^*(k+l+N), \quad (30)$$

has a triangular shape with its maximum at $k=k_0$. The total number of complex multiplications in (30) is dramatically reduced to PN. When the symbol duration (FFT size) of the OFDM system is not known, a few trials with all possible values for N may be needed for (30).

Once the timing synchronization is achieved at $k=k_0$, equation (29) may be used for the wireless transmitter identification by computation the correlation function at $k_0$ $$C_{m,r}(k_0) = \sum_{l=0}^{P-1} c_{P,r,m}(l) r^*(k_0+l), m = 0, 1, \ldots, M-1. \quad (31)$$

The local Kasami sequence $C_{P,r,m}$ pseudo random sequence that leads to the maximum output in (31) is the identification sequence of the transmitting wireless transmitter. In addition, the system parameter transmitted using the signal parameter element can be easily demodulated by cross-correlating the received signal with the locally generated Kasami sequence, specifically $$C_{m,i}(k_0) = \sum_{l=0}^{P-1} j c_{P,i,m}(l) r^*(k_0+l), m = 0, 1, \ldots, M-1. \quad (32)$$

The correlation in the above equation may be computed for every sequence in the Kasami code set. The local Kasami sequence with the largest output in (32) is the sequences coded from the system parameters. With the one to one mapping between the transmission parameter and $c_{P,r,m}$, the original data d in (26) used to encode the Kasami sequence may be retrieved. The overall system parameter detection error rate is derived in the Appendix as $$P_e = 1 - [1 - P_{e,m}]^{M-1}. \quad (33)$$

where $$P_{e,m} = Q\left(\frac{[A-t(n)+2]/2}{\sigma_n}\right) + \frac{1}{5}\sum_{i=1}^{5} Q\left(\frac{[A-t(n)+2]/2 - B_i}{\sigma_n}\right), \quad (34)$$

and $$Q(a) = \int_a^\infty \frac{1}{\sqrt{2\pi}} e^{-\frac{y^2}{2}} dy. \quad (35)$$

A is correlation peak of the Kasami sequence and $\sigma_n$ is the standard variance of the noise component in (32). $B_i$ is one of the five possible values in (22).

III. Spectrum Sensing of OFDM Signal

Sensing of Orthogonal frequency division multiplexing (OFDM) signal in low signal-to-noise ratio (SNR) may be significant for cognitive radio and spectrum efficient communications due to the wide applications of OFDM in many existing and evolving broadband wireless communications. In-band pilots, multiplexed with the data-carrying subcarriers, provide one distinct feature of OFDM signals. For PCP-OFDM signals, the PCP provides the time domain characteristics for PCP-OFDM signal detection.

Figure 11:
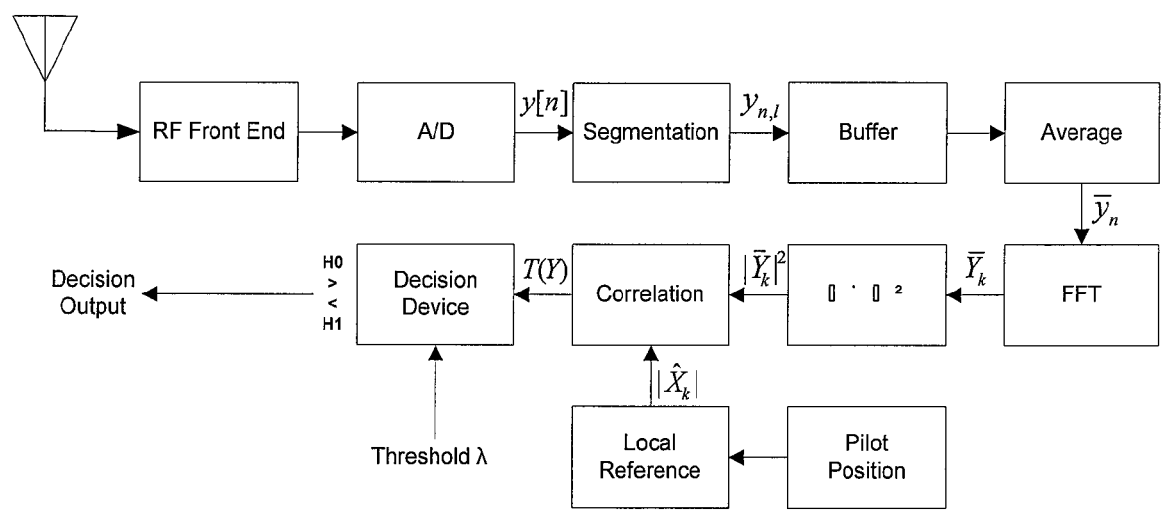
FIG. 11 illustrates in block diagram form one embodiment of the OFDM spectrum sensing technique.

One embodiment of the signal sensing technique for OFDM signal is illustrated in FIG. 11 in block diagram form. The proposed sensing technique for conventional OFDM signal sensing techniques may be to match the received signal y[n] with a pre-local reference (local reference block in FIG. 11) in the frequency domain using FFT (FFT block in FIG. 11). For conventional OFDM signal, the local reference may be the in-band pilot signal. For PCP-OFDM signal detection the identification element of the PCP may be used as a local reference. The received signal from the RF front end may be digitized using A/D converter, and then re-range as signal segment Segmentation of the Received Signal.

In one embodiment of the present invention, the first step of the algorithm is to segment the received baseband signal samples with a length of Ns which may be a complete OFDM symbol duration including the cyclic prefix. Because of the uncorrected timing offset between the transmitter and receiver at low SNR, the starting point of segmentation is unknown. As a result, each segment of the received signal may contain a complete time domain pilot sequence with duration of Ns samples but with an unknown timing offset.

Each segment of Ns samples may contain two incomplete adjacent OFDM symbols. However the unknown timing offset will be the same for all segments of the received signals. Since the effect of unknown timing offset in frequency domain is a phase rotation, it may therefore be possible to detect the OFDM with unknown timing offset in the frequency domain. Therefore, the impact of unknown time synchronization error on the OFDM spectrum sensing can be effectively mitigated under lower signal to noise ratio (SNR) conditions using the proposed segmentation of the received signal.

The segmented received signal may be stored in a buffer for future processing, including average and Fast Fourier transform (FFT). The spectrum sensing may be realized through the frequency correlation block in FIG. 11.

In addition, a spectrum sensing threshold determination technique based on noise parameter cancellation (NPC) method for OFDM signals is employed; where the frequency shifted received signals may be correlated with the local pilot reference.

Due to the characteristics of the reference signal in the OFDM signal, including pre-assigned pilots in conventional OFDM system and PCP sequence in the PCP-OFDM system, the statistics of the frequency domain correlator output T(Y) in FIG. 11 for reference sequence and data-carrying signal is completely different, which provides a distinct feature for the OFDM signal detection. Taking the ratio of the two kinds of noise related frequency domain correlations as the test statistics; the proposed detection algorithm can eliminate the restriction of prior noise knowledge and identify the primary signals from other potential interference sources simultaneously. In addition, the impacts of both time and frequency offsets are mitigated with the proposed signal segmentation and frequency domain correlation. In PCP-OFDM system, different PCP sequence can be used as local reference in "Local Reference" block in FIG. 11.

IV. Example in Operation

Computer simulations have been carried out to verify and extend the analytical results of the proposed PCP-OFDM in previous sections. The total number of the multiplications needed for the different receiver structures in (4) and (15)-(18) are plotted in FIG. 6. As observed from this figure, the complexity of the proposed demodulator is reduced substantially by using the wireless receiver as shown in FIG. 3(b) and (15)-(18). Two FFT/IFFT operations of (N+P)-point are saved due to the different equalization algorithms in the proposed hybrid domain equalizer. This is because the frequency domain equalization in (4) was performed on the size of (N+L) samples and the demodulation of the OFDM symbol should be on the original OFDM symbol size of N-point.

Figure 6:
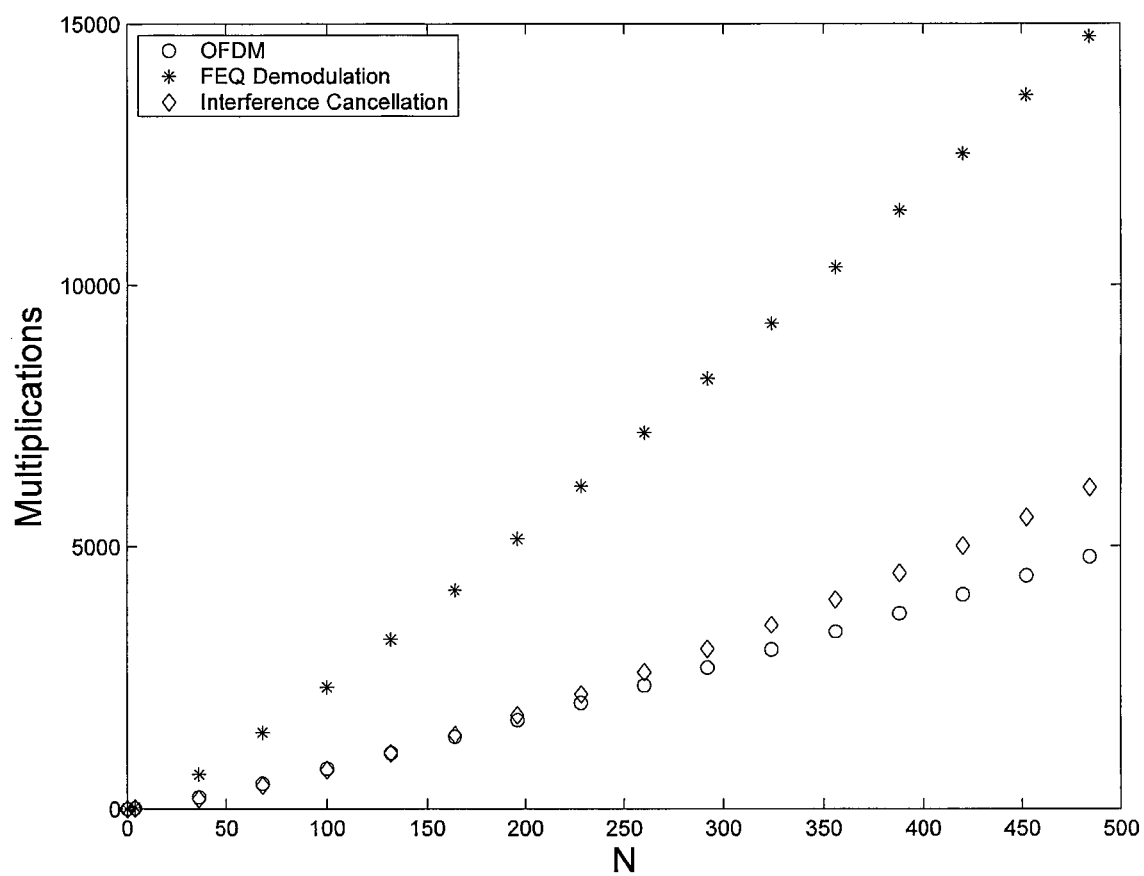
FIG. 6 illustrates the demodulation complexity of PCP-OFDM and CP-OFDM systems.

In one aspect of the present invention, the receiver structure in (15)-(18), equalization and demodulation of the OFDM symbol are both on N-point scale. The removal of ISI from the previous OFDM symbol and ICI may be achieved in the time domain. Therefore, the conversion between the frequency to time domain is avoided. Comparing the two equalization and demodulation approaches, the total number of the complex multiplications is reduced from $2(N+P) \log_2 (N+P)+N \log_2 N+P(P-1)/2$ to $N \log_2 N+P(P-1)/2$. As illustrated in FIG. 6, the total number of multiplications is reduced from around 15,000 to 6,500 for the OFDM system with FFT/IFFT size of 512. The number of saved multiplication increases for a PCP-OFDM with larger FFT/IFFT size.

Figure 7:
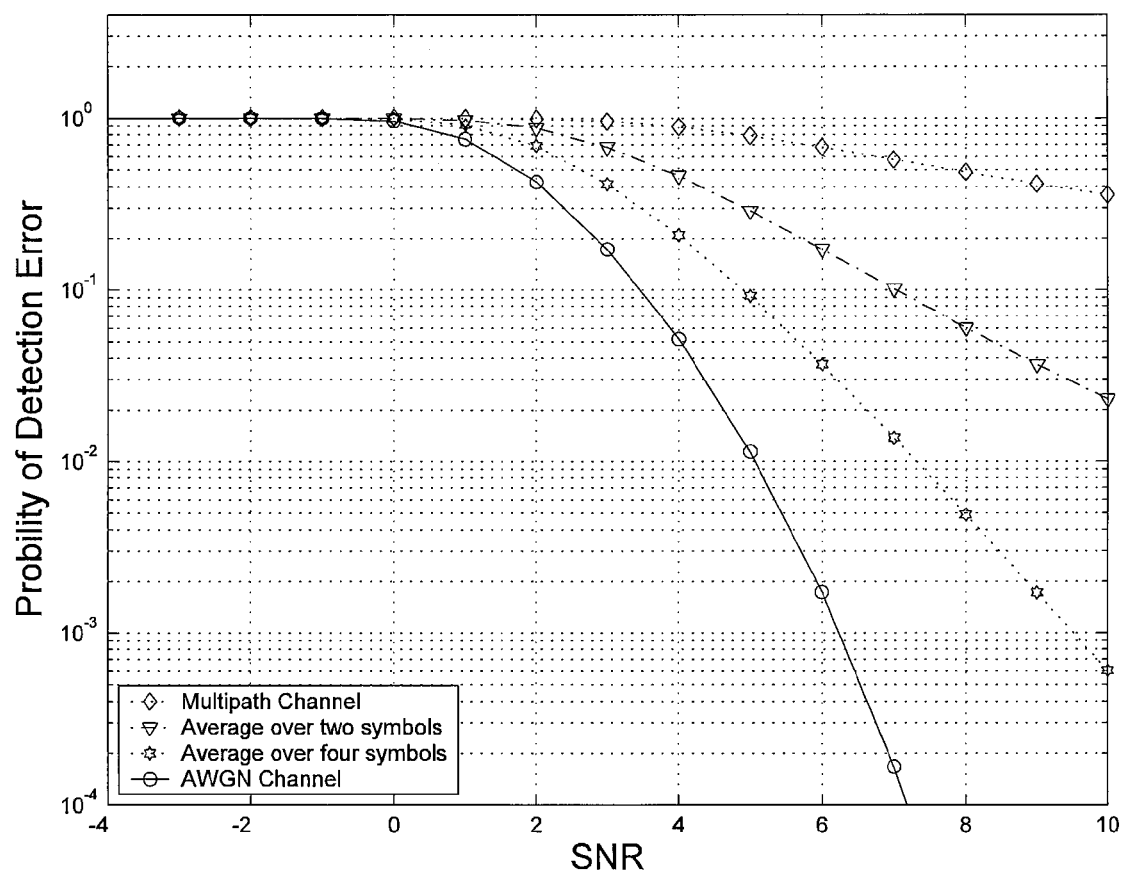
FIG. 7 illustrates the probability of detection error for one embodiment of the present invention with the duration of the Kasami sequence used in the simulation is 63.
Figure 8:
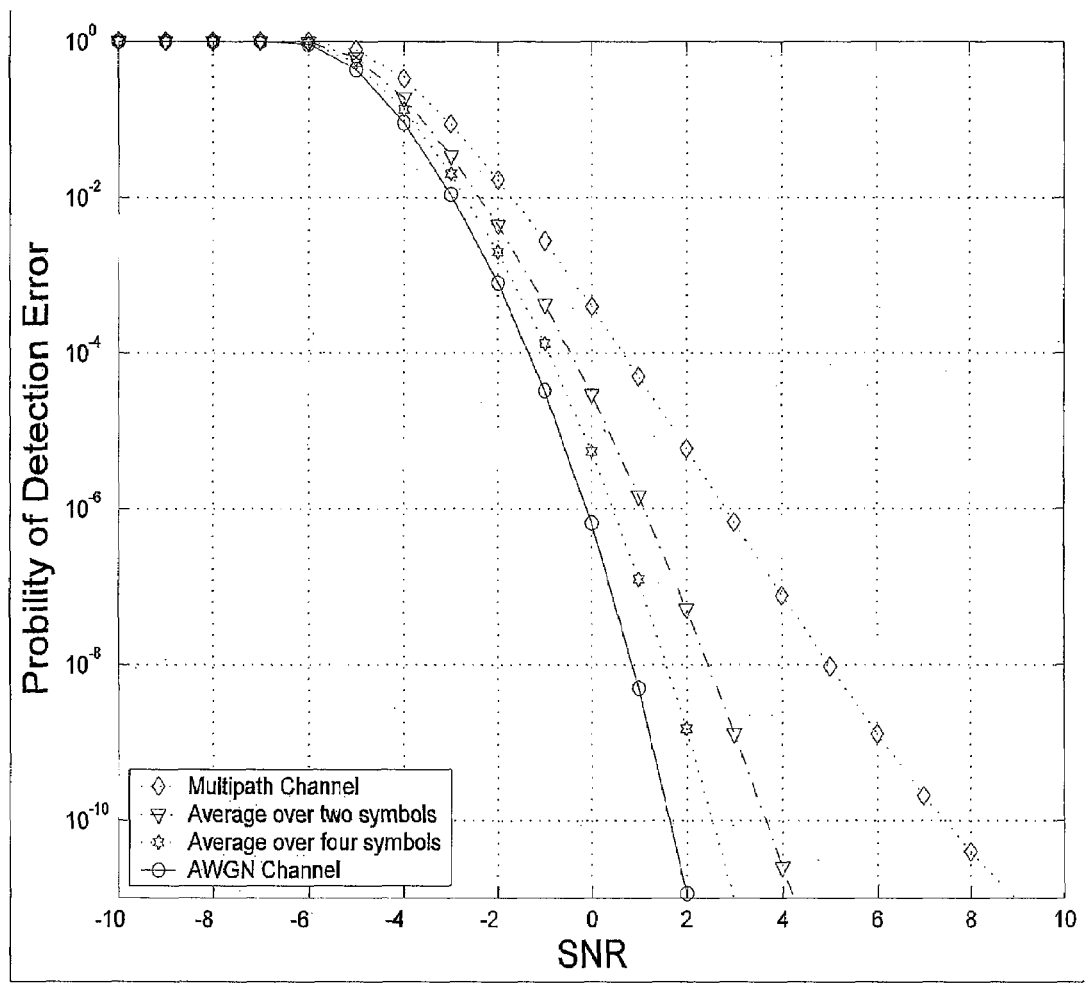
FIG. 8 illustrates the probability of detection error for one embodiment of the present invention with the duration of the PCP used in the simulation is 255.
Figure 9:
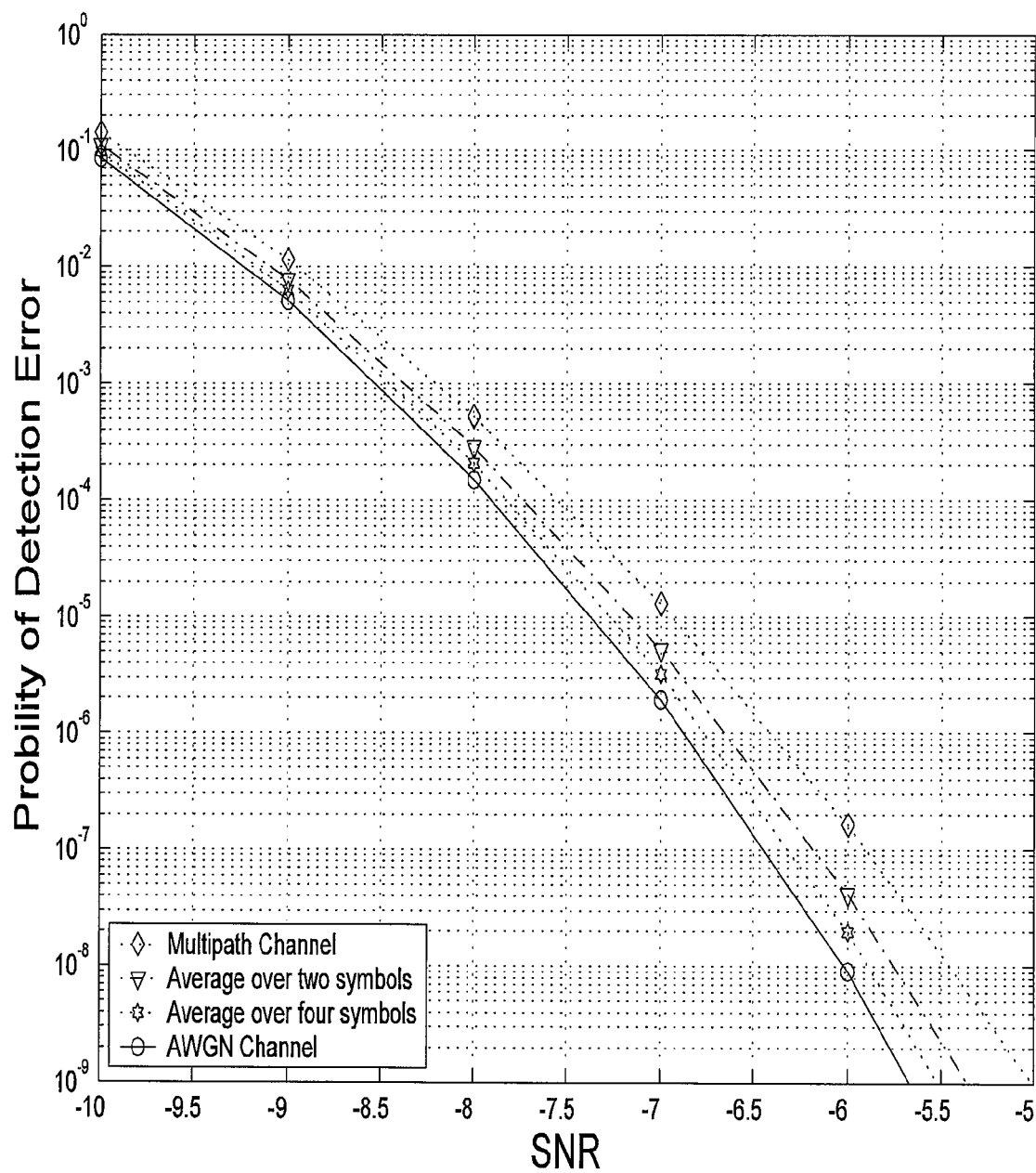
FIG. 9 illustrates the probability of detection error for one embodiment of the present invention with the duration of the PCP used in the simulation is 1023.

To evaluate the data transmission technology using the procoded cyclic prefix, the probability of the detection error for the system parameters for was simulated and plotted in FIGS. 7, 8 and 9 respectively. Three different Kasami sequences are considered in the simulation for n=6, n=8 and n=10. The corresponding periods of these sequences are 63, 255 and 1023. Note here the Kasami sequences for n=8 belong to a small set. It is observed that good CR system parameter detection performance is obtained at very low signal to noise ratio, even for the PCP with the duration of 63 samples.

Without any multipath interference mitigation, the detection error upper bound is $10^{-1}$ at the SNR of 10 dB. However, this number can be reduced to $10^{-2}$ when the detection is performed on the averaged PCP over two adjacent OFDM symbols. This number was further reduced to $10^{-4}$ when this average period is extended to four OFDM symbols. Since the operational SNR requirement for the OFDM system is much higher than the PCP system parameter transmission system, robust performance is expected for the proposed transmission scheme based on PCP.

In addition, a multipath interference cancellation technique and RAKE receiver may be used to improve the detection performance. Similar performance curves also exist for the PCP-OFDM using Kasami sequences of 255 and 1023 samples as its PCP. The difference is the detection performance was significantly improved when the duration of the cyclic prefix increased. Very low error rate is achieved without any multipath interference cancellation as illustrated in FIGS. 8 and 9. As seen in FIGS. 7 to 9, very robust performance can be achieved in the proposed the data transmission scheme using precoded cyclic prefix, even at very low SNR levels. As a result, no error correction coding is needed for the proposed system using Kasami sequences with period of 255 or 1023. A simple time domain averaging of neighboring PCP sequences can significantly improve the performance.

Numerical simulations have also been conducted to quantify the performance of the wireless communication PCP-OFDM receiver, particularly the hybrid domain equalizer. The demonstration OFDM system considered has an FFT size of 256 and PCP duration of 63 samples, which is about ¼ of the OFDM symbols duration. PCP-OFDM symbols are generated in the simulations as per FIG. 3(a). As for the channel model, we consider two static channel models:

Channel 1: $h_1 = [0.2592, 0, 0, 0, 0.8639, 0, 0, 0, -0.3455i, 0, 0.1728, 0, -0.0864i, 0, 0, 0.1728]^T$, and Channel 2: $h_2 = [0.9713, 0, 0, -0.0971+0.1943i, 0, 0, 0, 0.0971]^T$.

The first channel $h_1$ has a longer effective impulse response and hence a smaller coherent bandwidth. It also has more variation in the frequency response than $h_2$. Both channels can be considered as "bad" channels for OFDM because of their relatively large delay spreads, with Channel 1 depicting a more pessimistic scenario than Channel 2.

The emphasis of this investigation is to demonstrate the workability of PCP-OFDM and its potential application in cognitive radio and other communications. Consequently, "exact" channel modeling and parameter selections are only secondary concerns, as a lot depends on design issues such as: choice of frequency of operation; symbol rate; modulation; antenna types; antenna heights; terrain; rates of movement; and other geometrical factors (e.g., distances between antennas and distances to reflective surfaces).

Figure 5:
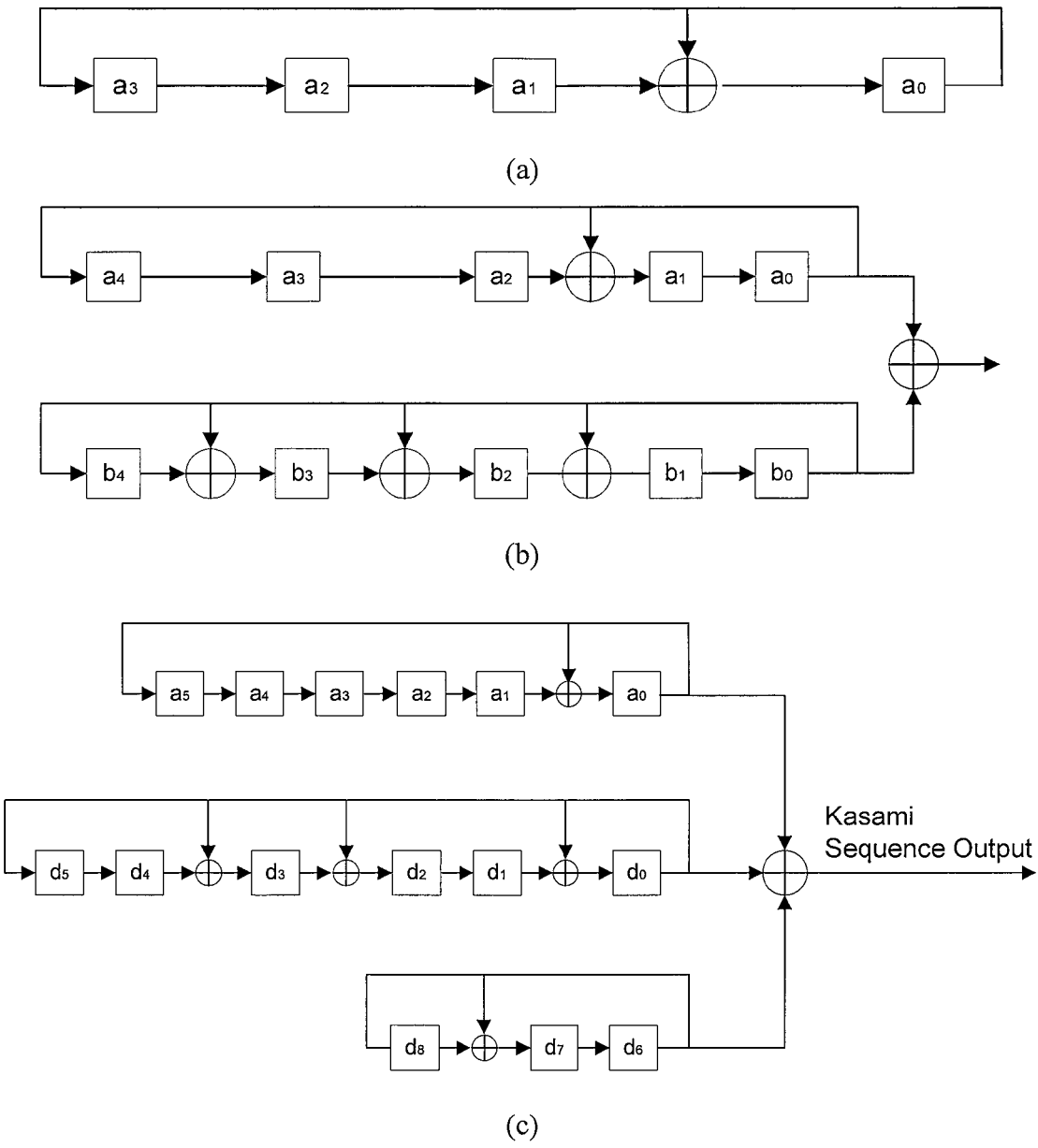
FIG. 5(a) illustrates a sample generated for one embodiment of the present invention using an m-sequence.
FIG. 5(b) illustrates a sample generated for one embodiment of the present invention using a Gold sequence.
FIG. 5(c) illustrates a sample generated for one embodiment of the present invention using a Kasami sequence with n=6.

The PCP used in the simulation was generated by a Kasami sequence generator shown in FIG. 5. Two Kasami sequences with period of 63 samples are combined together to generate the complex PCP to be inserted into OFDM signal. The first Kasami sequence is precoded by the transmitter identification for the cognitive radio transceiver. The signal parameter element of the PCP is modulated by nine bits information as the initial value to the Kasami sequence. The nine bits information provides sufficient information on system parameters of the cognitive radio to the receiver. It can support the choice of 512 different transmission platforms for CR communications, depending on the CR channel conditions including bandwidth, interference strength and mobility.

Figure 10:
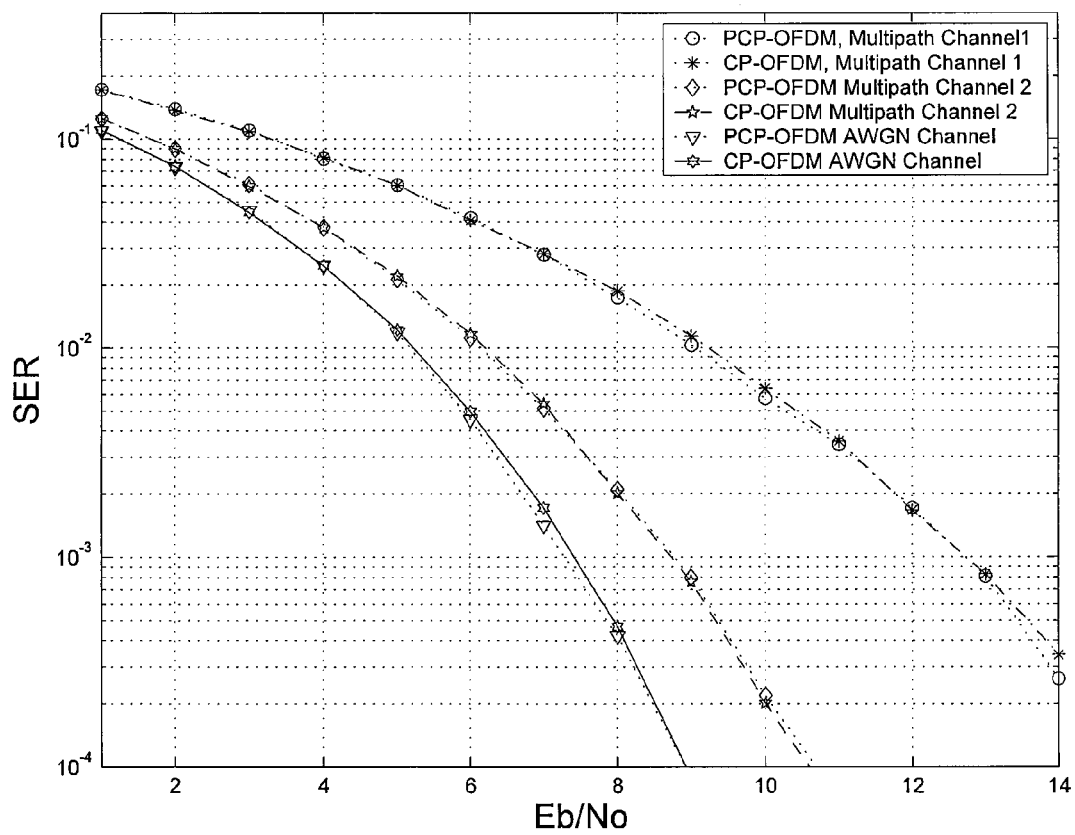
FIG. 10 illustrates the symbol error rate for the PCP-OFDM and conventional OFDM systems, using the number of the subcarriers, N, precoded cyclic prefix duration, P, and the modulation scheme in the PCP-OFDM systems are 256, 63 and 16QAM, respectively.

In case of using Kasami sequence with period of 1023 samples, the number of the different transmission platform supported can be as high as 32,768. The SER curves for 16QAM modulation were plotted in FIG. 10. As predicted, the replacement of the traditional cyclic prefix with the proposed precoded Kasami sequence has virtually no impact to the OFDM symbol error rate performance. The performance difference between the PCP-OFDM system and the traditional OFDM system with cyclic prefix is negligible. This can be explained by equation (15). ISI from the precoded cyclic prefix to PCP-OFDM symbol was removed and the cyclic structure for the received signal was reconstructed. Consequently there is no difference in using the precoded cyclic prefix and the traditional cyclic prefix. The equivalent performances of two different OFDM systems are shown in FIG. 10. The simulation results also confirm the effectiveness of our ISI and ICI cancellation techniques. Although similar performance characteristics are observed for Channel 2, there are, however, smaller gaps between the SER curves of the PCP-OFDM receiver and the lower bound achieved by the AWGN channel. Once again, this stems from the fact that Channel 1 is a more hostile channel than Channel 2.

A new adaptive OFDM system supporting fast and efficient spectrum allocation for future cognitive radio, variable-rate multimedia and other wireless communications is detailed above. The flexibility of the new OFDM platform is derived from the concurrent transmission of the system parameters of the cognitive radio (in one example of implementation of the invention) together with the OFDM signal. By encoding the transmission system parameters into the precoded cyclic prefix, preamble and handshaking signaling may be substantially simplified during the establishment or adaptation cognitive radio communication link under varying channel conditions.

In addition, the primary function of the precoded cyclic prefix as the guard interval in traditional OFDM to avoid intersymbol interference remains. The precoded cyclic prefix also provides an identification label for any OFDM signal emitted from a wireless communication transmitter. The corresponding wireless communication receiver for the OFDM system was designed based on the intersymbol interference and intercarrier interference cancellation algorithms.

Implementation complexity for a hybrid domain equalizer in accordance with the present inveiis dramatically reduced and is comparable to traditional OFDM systems. The probability of the detection error for the proposed system parameter transmission technique using PCP as well as symbol error rate of the PCP-OFDM were analyzed and verified through numerical simulations. With the PCP-OFDM platform, spectrum assignment will become more flexible and dynamic. Greater flexibility in responding to the dynamic channel conditions as well as various communication demands will be easily achieved.

REFERENCES

[1] U.S. Federal Communications Commission, "Notice of proposed rule making and order" ET Docket No 03-222, December 2003.
[2] I. F. Akyildiz, W.-Y. Lee, M. C. Vuran, S. Mohanty. "Next generation/dynamic spectrum access/cognitive radio wireless networks: A survey", *Computer Networks (Elsevier)*, vol. 50, no. 13, pp. 2127-2159, September 2006.
[3] J. Mitola III, "Software radio architecture: a mathematical perspective", *IEEE J. Sel. Areas Commun.*, vol. 17, no. 4, pp. 514-538, April 1999.
[4] J. Mitola III, "Cognitive radio: an integrated agent architecture for software defined radio", PhD Dissertation from Royal Institute of Technology, Sweden, May, 2000
[5] S. Haykin "Cognitive radio: brain-empowered wireless communications", *IEEE J. Sel. Areas Commun.*, vol. 23, no. 2, pp. 201-220, February 2005.
[6] X. Jing, S.-C. Mau, D. Raychaudhuri and R. Matyas "Reactive Cognitive Radio Algorithms for Co-Existence between IEEE 802.11b and 802.16a Networks", in *Proc. Globecom* 2005, pp. 2465-2469, November 2005.
[7] C. Eklund, R. B. Marks, K. L. Stanwood and S. Wang, "IEEE Standard 802.16: A technical overview of the wirelessMAN air interface for broadband wireless access", *IEEE Commun. Mag.*, vol. 40, no. 6, pp. 98-107, June 2002.
[8] Y. Wu, S. Hirakawa, U. Reimers and J. Whitaker, "Overview of digital television development worldwide", *Proc. IEEE*, vol. 94, no. 1, pp. 8-21, January 2006.
[9] U.S. Federal Communications Commission, "Unlicensed Operation in the TV Broadcast Bands," *ET Docket No.* 04-186, May, 2004.
[10] A. Mattsson, "Single frequency networks in DTV", *IEEE Trans. Broadcast.*, vol. 51, no. 4, pp. 413-422, December 2005.
[11] S. B. Weinstein and P. M. Ebert, "Data transmission by frequency division multiplexing using the discrete Fourier transform," *IEEE Trans. Commun.*, vol. COM-19, pp. 628-634, October 1971
[12] W. Y. Zou and Y. Wu, "COFDM: an overview", *IEEE Trans. Broadcast.*, vol. 41, no. 1, pp. 1-8 Mar. 1995
[13] X. Wang, P. Ho, and Y. Wu, Robust Channel Estimation and ISI Cancellation for OFDM Systems With Suppressed Features, *IEEE J. Sel. Areas Commun.*, vol. 23, no. 5, pp. 963-972, May, 2005.
[14] X. Wang, Y. Wu, J.-Y. Chouinard, and H.-C. Wu, "On the Design and Performance Analysis of Multi-Symbol Encapsulated OFDM Systems", *IEEE Trans. on Veh. Technol.*, vol. 55, no. 3, pp. 990-1002, May 2006.
[15] M. Muck, M. Courville, M Debbah, and P. Duhamel, "A Pseudo Random Postfix OFDM modulator and inherent channel estimation techniques", in *Proc. Globecom* 2003, pp. 2380-2384, November 2003.
[16] B. Muquet, Z. Wang, G. B. Giannakis, M. D. Courville, and P. Duhamel, "Cyclic prefixing or zero padding for wireless multicarrier transmissions?", *IEEE Trans. Commun.*, vol. 50, no. 12, pp. 2136-2148, December 2002.
[17] V. Lomi, D. Tonetto, and L. Vangelista, "False alarm probability-based estimation of multipath channel length," *IEEE Trans. Commun.*, vol. 51, no. 9, pp. 1432-1434, September 2003.
[18] X. Wang, Y. Wu, and J. Y. Chouinard, "Modified channel estimation algorithms for OFDM systems with reduced complexity," in *Proc. 7th Int. Conf. Signal Process.*, vol. 2, Beijing, China, September 2004, pp. 1747-1751.
[19] W. W. Peterson and E. J. Weldon, "Error-Correction Codes ($2^{nd}$ Edition)", MIT press, 1972.
[20] R. E. Ziemer and R. L. Peterson, "Digital Communications and Spread Spectrum Systems", Macmillan, 1985.
[21] D. V. Sarwate and M. B. Pursley, "Cross Correlation Properties of Pseudorandom and Related Sequences", *Proc. IEEE*, vol. 68, no. 5, pp. 593-619, May 1980.
[22] X. Wang, Y. Wu, and B. Caron, "Transmitter identification using embedded pseudo random sequences," *IEEE Trans. Broadcast.*, vol. 50, no. 3, pp. 244-252, 2004.
[23] G. M. Dillard, M. Reuter, J. Zeidler, B. Zeidler, "Cyclic Code Shift Keying: A Low Probability of Intercept Communication Technique", *IEEE Trans. Aerospace Electron. Syst.* vol. 39, no. 3, pp. 786-798, July 2003.

[24] S. Erkucuk and D. I. Kim, "Combined M-ary Code Shift Keying/Binary Pulse Position Modulation for Ultra Wideband Communications", in *Proc. Globeom* 2004, pp. 804-808, November 2004.

What is claimed is:

1. A method for adaptive signal communication on a wireless or wireline network based on transmitter-receiver adaptation and interaction comprising the following steps for transmission and reception of an adaptive communication signal:

at a transmitter:
   (a) detecting the communication environment and determining communication requirements by a common interface device from at least one local information source and controlling information received by the local receiver from a remote transmitter, for combined communication supporting at least one data stream on the wireless or wireline network;
   (b) determining system transmission parameter information for adaptive Orthogonal Frequency Division Multiplexing (OFDM) transmission based on the communication environment or communication requirements in (a);
   (c) dynamically encoding a binary sequence to represent a transmission scheme associated with the system transmission parameter information in (b);
   (d) generating complex precoded cyclic prefix (PCP) providing an identification element and a system transmission parameter element based on the selected binary sequence in (c);
   (e) generating a PCP-OFDM symbol transmission by combining in a communication signal (i) the at least one encoded PCP sequence, and (ii) an adaptive OFDM symbol without introducing any repetition of the OFDM symbol itself, wherein the adaptive OFDM symbol is generated with the data to be transmitted and the system transmission parameters encoded in the encoded PCP, thereby enabling adaptive transmission of the data based on the system parameters affecting the transmission;
   (f) transmitting the communication signal from at least one OFDM transmitter to at least one OFDM receiver; and at a receiver:
   (g) receiving the communication signal and demodulating the at least one PCP to retrieve the system parameter information encoded into the PCP and estimating communication channel;
   (h) demodulating the OFDM symbol and dividing the recovered combined data stream into original multiple form using the identification and system parameters recovered in step (g), after cancelling the interference from PCP to data-carrying OFDM signal using recovered PCP and channel in (g) and equalizing the received signal; and
   (i) communicating controlling information to the local transmitter;

wherein the binary sequence includes a pseudo random sequence comprising one of an m-sequence, a Gold sequence or a Kasami sequence, and the interactive operation of an OFDM transmitter or receiver is enabled by the system transmission parameter information encoded into the PCP, the identification element of the PCP being a wireless or wireline communication transmitter identification.

2. The method of claim 1 for PCP enabled transmitter-receiver interaction, and the method further comprises the step of the OFDM transmitter and the OFDM receiver adapting a communication link therebetween using the PCP.

3. The method of claim 2 wherein the OFDM transmitter includes or is linked to a common interface device, receiver controlling information, a spectrum sensing and controlling unit (SSCU), and at least one OFDM signal generator is operable to generate one or more OFDM symbols, comprising the further step of the OFDM signal generator generating one or more adaptive OFDM symbols using variable system transmission parameters including a data carrying multicarrier modulated signal section and the PCP.

4. The method of claim 3 wherein the data carrying multicarrier modulated communication signal is generated using the Inverse Fast Fourier Transform (IFFT), with its size, bandwidth, modulation scheme, transmission power and carrier frequency controlled by the SSCU.

5. The method claimed in claim 3 wherein the PCP comprises at least one signal sequence, representing system transmission parameters of the OFDM wireless or wireline communication platform, and controlling information sent to at least one OFDM receiver.

6. The method of claim 5 wherein the PCP for each OFDM symbol is changed from one OFDM symbol to another, encoded from at least one binary sequence representing the controlling information from the SSCU.

7. The method of claim 5 wherein the PCP is combined with one OFDM symbol generated by the system parameter carried by the PCP depending on the controlling information from the SSCU, and with instruction identified for transmission, said PCP being at least one pseudo random sequence generated by a binary sequence representing the controlling information from SSCU, the transmitter further including one additional identical PCP and a guard time before new PCP and OFDM symbol with new system parameters can be used, wherein a series of new OFDM symbols are generated using the new system transmission parameters encoded into the new PCP, and the transmitted signal can adapt its bandwidth by changing the size of the inverse Fourier transform.

8. The method of claim 5 wherein the at least one PCP signal sequence is a complex Kasami sequence.

9. The method of claim 5 comprising the further steps of:
   (a) generating an identification element of the sequence which represents identification of the transmitter and remains unchanged; and
   (b) a system transmission parameter element is modulated by a binary sequence representing the controlling information from SSCU.

10. The method of claim 5 wherein the at least one signal sequence is precoded by transmitter instruction and system parameters, including one or more of modulation and coding schemes, transmission bandwidth, carrier frequency, instruction to receivers including combination schemes for multiple data streams, and transmitter identification.

11. The method of claim 1 comprising the additional step of determining the combined communication controlling information from parameters of at least one multimedia communication data stream from its associated binary information source.

12. The method of claim 1 comprising the further step of identifying an OFDM transmitter by differentiating received signals by their transmitting source using the identification element of the PCP sequence.

13. The method of claim 12 comprising the further step of initiating a frame synchronization method using the correlation between the received signal and the identification element of the PCP sequence.

14. The method of claim 1 comprising adaptive communication signal receiving, such adaptive communication signal receiving including the following steps: i) cancelling or reducing interference so as to remove or reduce intra-carrier interference (ICI) or inter-block Interference (IBI) caused by the introduction of the PCP, reconstructed using the identified PCP and an estimated channel impulse response, or ii) equalizing one OFDM symbol and its PCP at the same time in a frequency domain and converting the equalized signal back to time domain using Fast Fourier Transform (FFT) and IFFT with size of the OFDM symbol and the PCP combined, and removing the equalized PCP from the time domain equalized signal and demodulating the OFDM signal using FFT with size of the OFDM symbol only.

15. The method claimed in claim 9 wherein the method comprises the additional step of a spectrum sensing technique for unsynchronized PCP-OFDM and conventional OFDM signals which are based on:
  (a) the correlation between the spectrum from the identification element of PCP sequence and received PCP-OFDM signal, wherein the spectrum OFDM signal is computed from the signal segment with duration of N+Ncp samples, where N and Ncp are the duration of the OFDM symbol and precoded cyclic prefix, and the spectrum of the PCP sequence are computed from zero-padded PCP sequence with duration of N+Ncp samples, where all following N samples are set to zero; and
  (b) the correlation of between the spectrum from the local in-band pilots reference and received conventional OFDM signal, wherein the spectrum OFDM signal is computed from the signal segment with duration of N+Ncp samples, where N and Ncp are the duration of the OFDM symbol and cyclic prefix, and the spectrum of the in-band pilot reference are computed from pilot only OFDM signal with duration of N+Ncp samples, where all the data carrying subcarriers are set to zero.

16. A system for adaptive signal communication on a wireless or wireline network based on transmitter-receiver adaptation and interaction, wherein the system is adapted to perform the following for transmission and reception of an adaptive communication signal:
  at a transmitter:
    (a) detect the communication environment and determine communication requirements by a common interface device from at least one local information source and control information received by the local receiver from a remote transmitter, for combined communication supporting at least one data stream on the wireless or wireline network;
    (b) determine system transmission parameter information for adaptive Orthogonal Frequency Division Multiplexing (OFDM) transmission based on the communication environment or communication requirements in (a);
    (c) dynamically encode a binary sequence to represent a transmission scheme associated with the system transmission parameter information in (b);
    (d) generate a complex precoded cyclic prefix (PCP) providing an identification element and a system transmission parameter element based on the selected binary sequence in (c);
    (e) generate a PCP-OFDM symbol transmission by combining in a communication signal (i) the at least one encoded PCP sequence, and (ii) an adaptive OFDM symbol without introducing any repetition of the OFDM symbol itself, wherein the adaptive OFDM symbol is generated with the data to be transmitted and the system transmission parameters encoded in the encoded PCP, thereby enabling adaptive transmission of the data based on the system parameters affecting the transmission;
    (f) transmit the communication signal from at least one OFDM transmitter to at least one OFDM receiver; and
  at a receiver:
    (g) receive the communication signal and demodulate the at least one PCP to retrieve the system parameter information encoded into the PCP and estimating communication channel;
    (h) demodulate the OFDM symbol and divide the recovered combined data stream into original multiple form using the identification and system parameters recovered in (g), after cancelling the interference from PCP to data-carrying OFDM signal using the recovered PCP and channel in (g) and equalizing the received signal; and
    (i) communicate controlling information to the local transmitter;
  wherein the binary sequence includes a pseudo random sequence comprising one of an m-sequence, a Gold sequence or a Kasami sequence, and the interactive operation of an OFDM transmitter or receiver is enabled by the system transmission parameter information encoded into the PCP, the identification element of the PCP being a wireless or wireline communication transmitter identification.

17. A non-transitory computer readable media storing computer code that when loaded onto transmitter and receiver devices adapts the devices to perform a method for adaptive signal communication on a wireless or wireline network based on transmitter-receiver adaptation and interaction, the non-transitory computer readable media comprising:
  (a) code for detecting, at a transmitter, the communication environment and determining communication requirements by a common interface device from at least one local information source and controlling information received by the local receiver from a remote transmitter, for combined communication supporting at least one data stream on the wireless or wireline network;
  (b) code for determining, at the transmitter, system transmission parameter information for adaptive Orthogonal Frequency Division Multiplexing (OFDM) transmission based on the communication environment or communication requirements in (a);
  (c) code for dynamically encoding, at the transmitter, a binary sequence to represent a transmission scheme associated with the system transmission parameter information in (b);
  (d) code for generating, at the transmitter, a complex precoded cyclic prefix (PCP) providing an identification element and a system transmission parameter element based on the selected binary sequence in (c);
  (e) code for generating, at the transmitter, a PCP-OFDM symbol transmission by combining in a communication signal (i) the at least one encoded PCP sequence, and (ii) an adaptive OFDM symbol without introducing any repetition of the OFDM symbol itself, wherein the adaptive OFDM symbol is generated with the data to be transmitted and the system transmission parameters encoded in the encoded PCP, thereby enabling adaptive transmission of the data based on the system parameters affecting the transmission;
  (f) code for transmitting the communication signal from at least one OFDM transmitter to at least one OFDM receiver;

(g) code for receiving, at a receiver, the communication signal and demodulating the at least one PCP to retrieve the system parameter information encoded into the PCP and estimating communication channel;

(h) code for demodulating, at the receiver, the OFDM symbol and dividing the recovered combined data stream into original multiple form using the identification and system parameters recovered in (g), after cancelling the interference from PCP to data-carrying OFDM signal using recovered PCP and channel in (g) and equalizing the received signal; and (i) code for communicating controlling information to the local transmitter;

wherein the binary sequence includes a pseudo random sequence comprising one of an m-sequence, a Gold sequence or a Kasami sequence, and the interactive operation of an OFDM transmitter or receiver is enabled by the system transmission parameter information encoded into the PCP, the identification element of the PCP being a wireless or wireline communication transmitter identification.

\* \* \* \* \*